(12) United States Patent
Yamamura et al.

(10) Patent No.: US 9,970,536 B2
(45) Date of Patent: May 15, 2018

(54) SHIFT DEVICE

(71) Applicant: KABUSHIKI KAISHA TOKAI-RIKA-DENKI-SEISAKUSHO, Aichi-ken (JP)

(72) Inventors: Norihiro Yamamura, Aichi-ken (JP); Shosaku Watarai, Aichi-ken (JP); Munetoshi Makimura, Aichi-ken (JP); Atsushi Ishida, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 338 days.

(21) Appl. No.: 14/701,949

(22) Filed: May 1, 2015

(65) Prior Publication Data

US 2015/0323064 A1 Nov. 12, 2015

(30) Foreign Application Priority Data

May 12, 2014 (JP) .................................. 2014-098859
Apr. 16, 2015 (JP) .................................. 2015-084194

(51) Int. Cl.
| F16H 61/18 | (2006.01) |
| F16H 59/08 | (2006.01) |
| F16H 59/10 | (2006.01) |
| F16H 61/22 | (2006.01) |
| B60K 20/04 | (2006.01) |

(52) U.S. Cl.
CPC ............. *F16H 61/18* (2013.01); *B60K 20/04* (2013.01); *F16H 59/08* (2013.01); *F16H 59/10* (2013.01); *F16H 61/22* (2013.01); *Y10T 74/20085* (2015.01)

(58) Field of Classification Search
CPC .......... F16H 61/18; F16H 61/22; F16H 59/10; F16H 59/08; B60K 20/04; Y10T 74/20085
USPC ......................................... 74/473.21–473.26
See application file for complete search history.

(56) References Cited

U.S. PATENT DOCUMENTS

| 7,814,810 | B2 * | 10/2010 | Mitteer | F16H 61/22 |
| | | | | 192/220.2 |
| 2002/0040615 | A1 * | 4/2002 | Tomida | F16H 59/10 |
| | | | | 74/523 |
| 2004/0244524 | A1 * | 12/2004 | Russell | F16H 59/10 |
| | | | | 74/473.23 |
| 2008/0083294 | A1 * | 4/2008 | Gorman | F16H 59/10 |
| | | | | 74/473.25 |
| 2014/0007729 | A1 * | 1/2014 | Fredriksson | F16H 59/0278 |
| | | | | 74/473.21 |

(Continued)

FOREIGN PATENT DOCUMENTS

JP 2013-193600 9/2013

*Primary Examiner* — Victor L MacArthur
(74) *Attorney, Agent, or Firm* — Roberts Mlotkowski Safran Cole & Calderon P.C.

(57) ABSTRACT

A shift device is configured including a restriction member and a release section. The restriction member stops a detent pin that has been moved at a release position, restricting movement of a shift lever to a third shift position when the shift lever is moved from a first shift position to a second shift position. When the shift lever has been moved at the second shift position, by the detent pin being moved to the release position from a non-release position, the release section releases the restriction of movement of the shift lever toward the third shift position by the restriction member.

12 Claims, 25 Drawing Sheets

(56) References Cited

U.S. PATENT DOCUMENTS

2015/0323064 A1\* 11/2015 Yamamura .............. F16H 61/18
74/473.21

\* cited by examiner

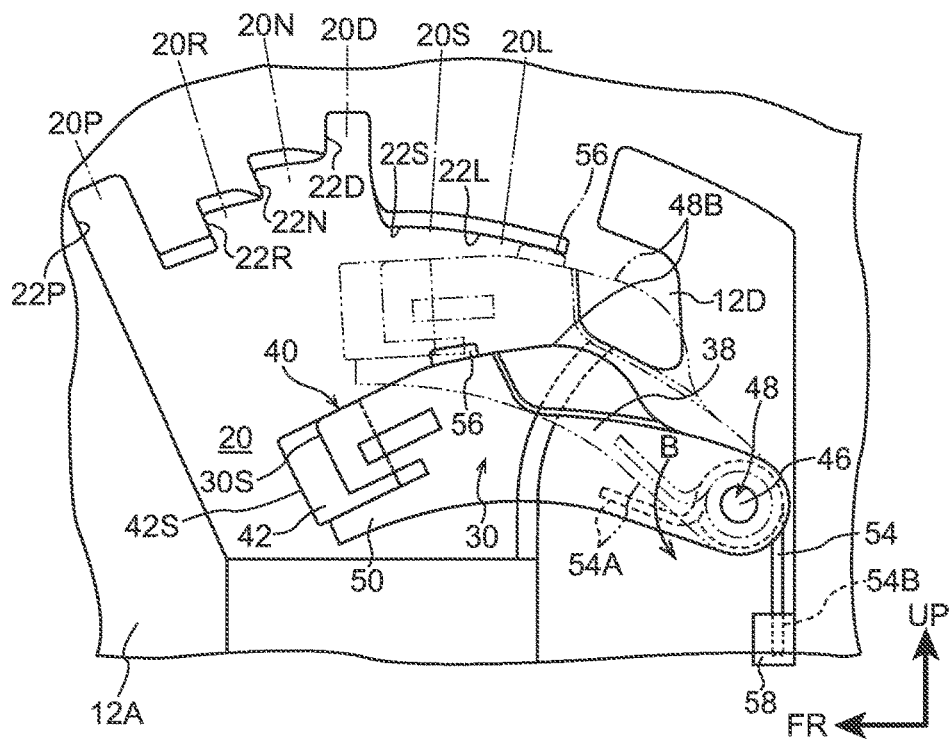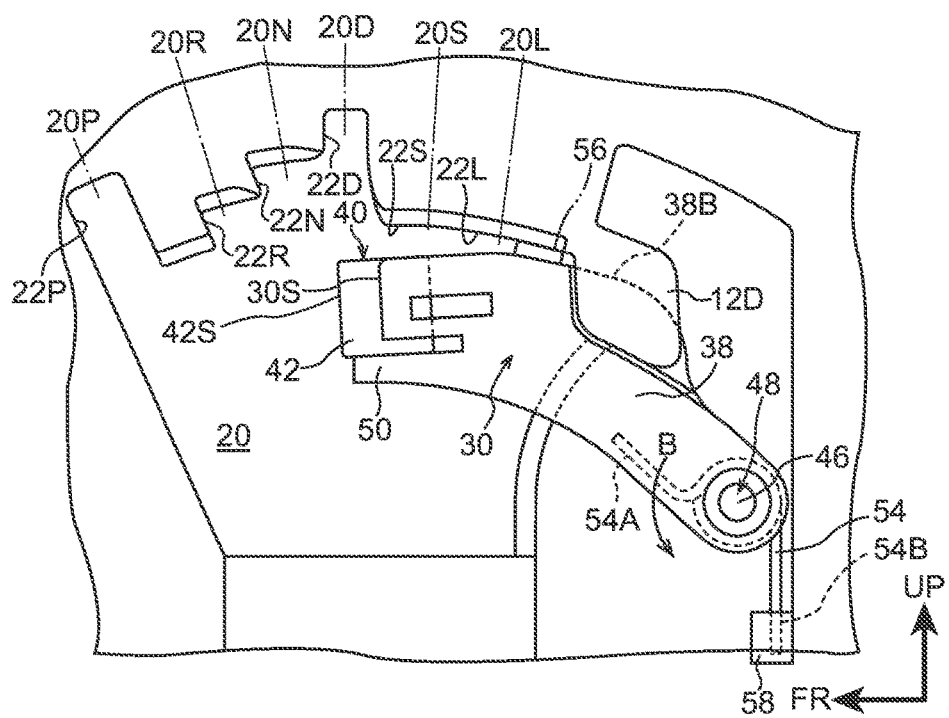

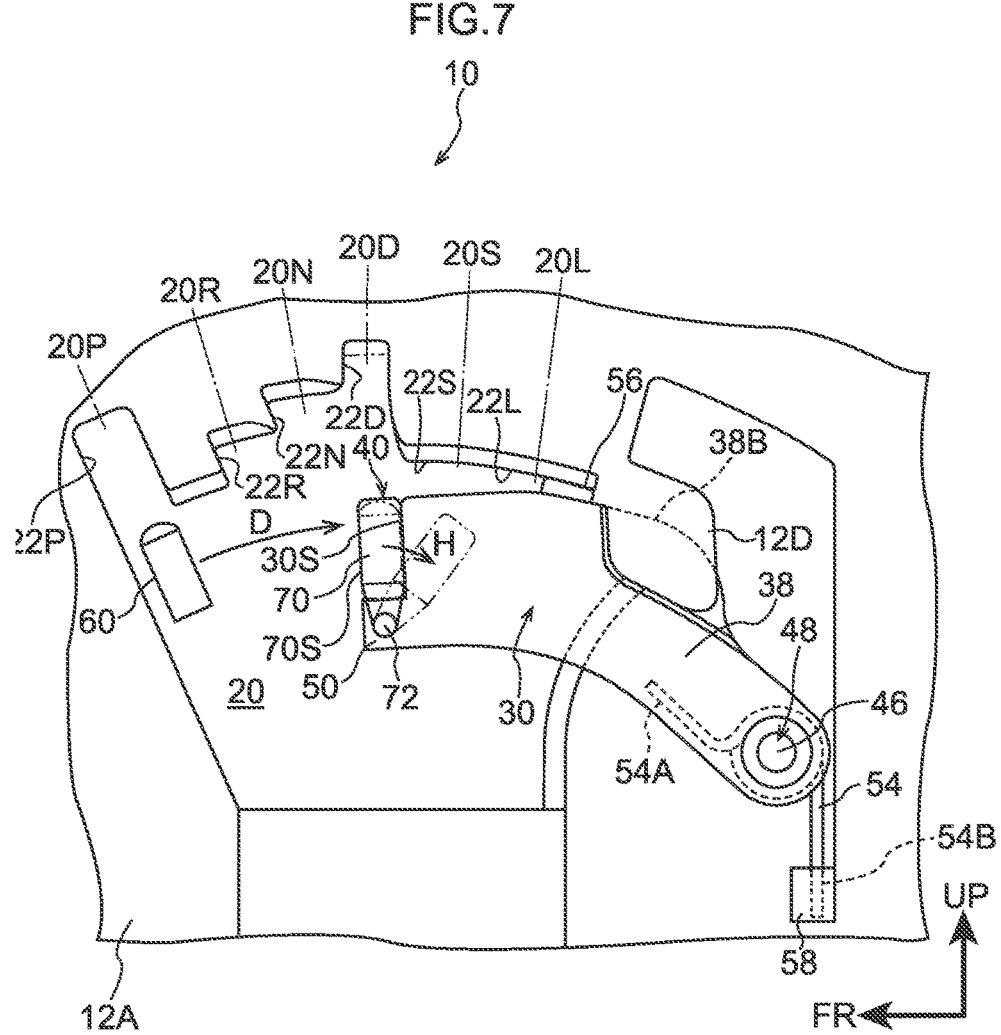

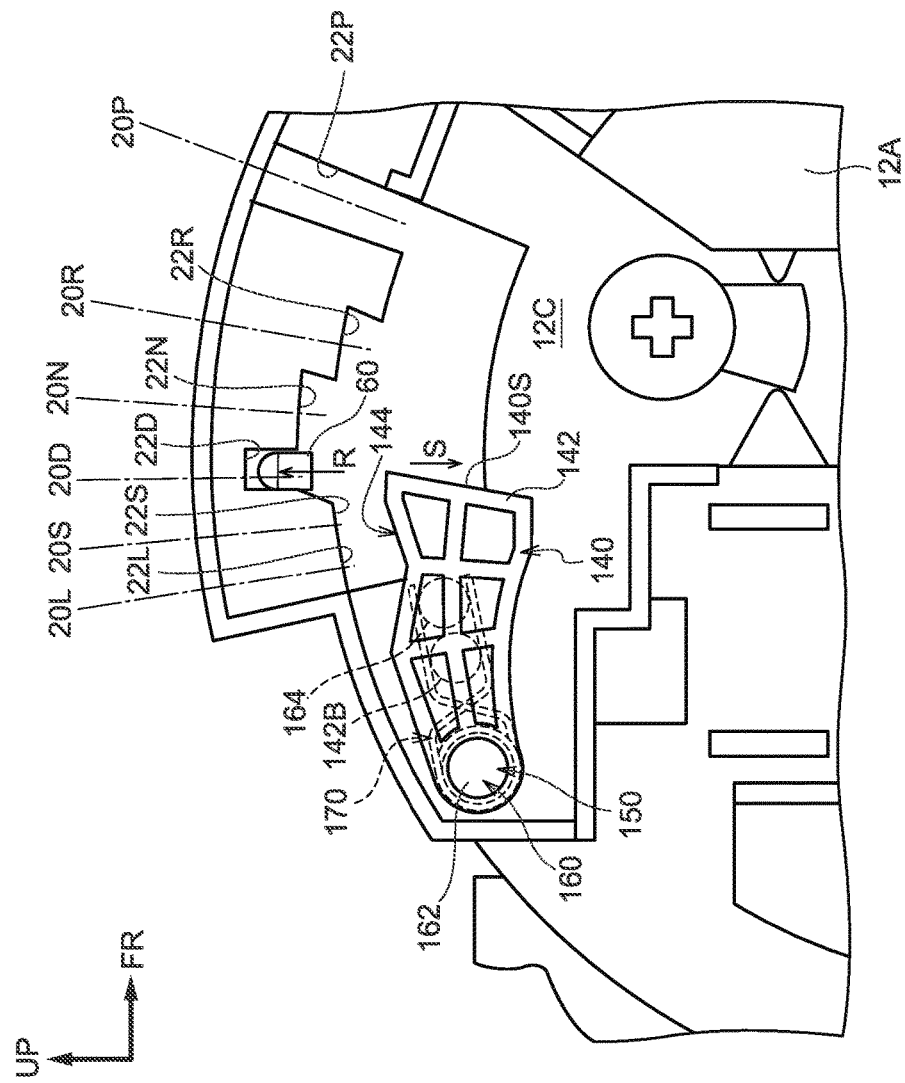

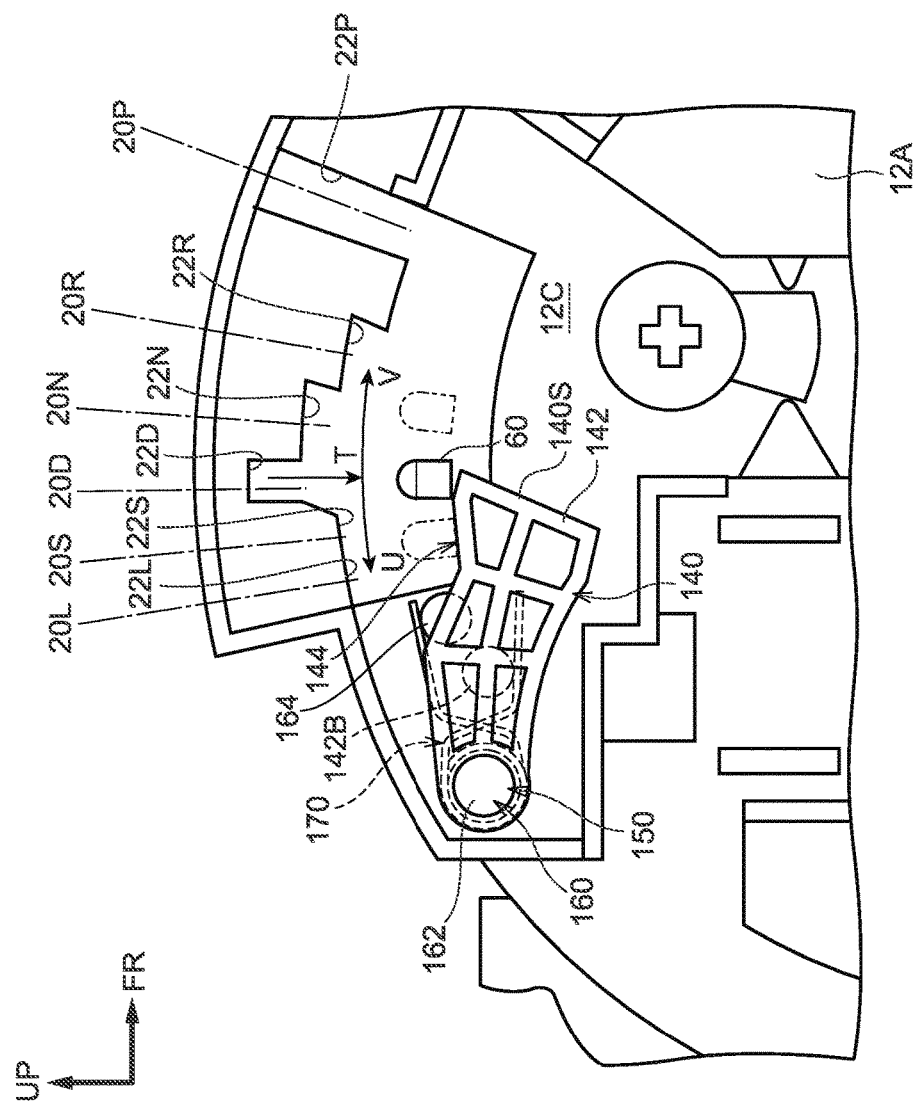

SHIFT DEVICE

CROSS-REFERENCE TO RELATED APPLICATION

This application claims priority under 35 USC 119 from Japanese Patent Applications No. 2014-098859 filed May 12, 2014 and No. 2015-084194 filed Apr. 16, 2015, the disclosures of which are incorporated by reference herein.

BACKGROUND

Field of the Invention

The present invention relates to a shift device.

Related Art

Japanese Patent Application Laid-Open (JP-A) No. 2013-193600 describes a straight type selector device for an automatic vehicle transmission. In the selector device, when a driver moves a shift lever from a parking range to a drive range in an operated state of a brake pedal, a stopper blocks movement of a detent pin that is in a locked state. Movement of the shift lever is accordingly stopped at the drive range.

In such a selector device, when moving the shift lever from the parking range to the drive range, it is desirable to stop the shift lever at the drive range even in a lock-released state of the detent pin.

SUMMARY

In consideration of the above circumstances, a shift device is obtained that enables movement of a shift member from a second shift position to a third shift position to be restricted during operation of the shift member from a first shift position to the second shift position, even when the detent pin has been moved to a release position.

A shift device according to a first aspect includes:

a shift member that is capable of moving from a first shift position to a third shift position through a second shift position;

a detent pin that is provided at the shift member and that is movable between a non-release position and a release position on the shift member, movement of the shift member from the first shift position to the second shift position being enabled by the detent pin being moved at the release position;

a restriction member that stops the detent pin which has been moved at the release position to restrict movement of the shift member toward the third shift position when the shift member is moved from the first shift position to the second shift position; and a release section that, when the shift member has been moved at the second shift position, releases restriction of movement of the shift member toward the third shift position by the restriction member, by the detent pin being moved from the non-release position toward the release position.

In the shift device according to the first aspect, the shift member is capable of moving from the first shift position to the third shift position, past the second shift position. The shift member is provided with the detent pin, and the detent pin is moved to the release position so as to enable movement of the shift member from the first shift position to the second shift position.

Note that when the shift member is moved from the first shift position to the second shift position, the detent pin that has been moved at the release position (namely, that is at the release position) is stopped by the restriction member, restricting movement of the shift member to the third shift position. Once the shift member has been moved at the second shift position (namely, when the shift member is at the second shift position), the release section utilizes the movement of the detent pin from the non-release position toward the release position to release the restriction of movement of the shift member toward the third shift position by the restriction member. This thereby enables the shift member that is being moved from the first shift position to be stopped at the second shift position, even when the detent pin has been moved at the release position, and moreover, the release section enables the shift member that has been moved at the second shift position to be moved to the third shift position.

In a shift device according to a second aspect, in the shift device of the first aspect, the release section includes:

a movable member that is moved by the detent pin which has been moved at the release position when the shift member is moved from the first shift position to the second shift position, and whose movement by the detent pin is canceled by movement of the detent pin to the release position being canceled when the shift member has been moved at the second shift position; and a movement section that, when the shift member has been moved at the second shift position, moves the restriction member via the movable member by the detent pin being moved from the non-release position toward the release position, to release the restriction of movement of the shift member toward the third shift position.

In the shift device according to the second aspect, the release section includes the movable member and the movement section. The movable member is moved by the detent pin that has been moved at the release position when movement of the shift member from the first shift position to the second shift position. When the shift member has been moved at the second shift position, the movement of the movable member is canceled when movement of the detent pin to the release position is canceled. On the other hand, when the shift member has been moved at the second shift position, the movement section moves the restriction member via the movable member by the detent pin being moved from the non-release position toward the release position, so releasing the restriction of movement of the shift member toward the third shift position. Therefore, in the release section, without "moving the shift member from the first shift position to the second shift position, canceling the movement of the detent pin to the release position (moving the detent pin to the non-release position side), and moving the detent pin back to the release position again" the restriction member accordingly cannot be moved to release the restriction of movement of the shift member toward the third shift position.

In a shift device according to a third aspect, in the shift device of the second aspect, the movable member is capable of moving with respect to the restriction member in a movement direction of the detent pin when the detent pin is moved accompanied by movement of the shift member from the first shift position toward the second shift position; and the movable member is restricted from moving with respect to the restriction member in a movement direction of the detent pin when the detent pin is moved toward the release position from the non-release position.

In the shift device according to the third aspect, the movable member is capable of moving with respect to the restriction member in the movement direction of the detent pin accompanying movement of the shift member from the first shift position toward the second shift position. When movement of the shift member from the first shift position to the second shift position, the detent pin that has been moved at the release position accordingly moves the movable member and is stopped by the restriction member, thereby restricting movement of the shift member toward the third shift position. On the other hand, the movable member is restricted from moving with respect to the restriction member in the movement direction of the detent pin toward the release position from the non-release position. Movement of the detent pin toward the release position from the non-release position accordingly moves the restriction member via the movable member that is restricted from moving in this movement direction with respect to the restriction member, thereby releasing the restriction of movement of the shift member toward the third shift position.

In a shift device according to a fourth aspect, in the shift device of either the second aspect or the third aspect, the movement section is configured so as to turn (rotate) the restriction member.

In the shift device according to the fourth aspect, the movement section is configured so as to turn the restriction member, thereby enabling a simple configuration of the movement section.

In a shift device according to a fifth aspect, in the shift device of either the second aspect or the third aspect, the movement section is configured so as to slide the restriction member.

In the shift device according to the fifth aspect, the movement section is configured so as to slide the restriction member, thereby enabling a simple configuration of the movement section.

In a shift device according to a sixth aspect, in the shift device of the first aspect, the release section includes a resilient member, wherein:

when the shift member has been moved at the second shift position, the resilient member moves the restriction member to a movement start position at which releasing of the restriction of movement of the shift member toward the third shift position by the restriction member is started when movement of the detent pin to the release position is canceled; and when the shift member has been moved at the second shift position, the detent pin moves, against an urging force of the resilient member, the restriction member from the movement start position to release the restriction of movement of the shift member toward the third shift position by the restriction member, by the detent pin being moved from the non-release position toward the release position.

In the shift device according to the sixth aspect, the release section includes the resilient member. When the shift member has been moved at the second shift position, the resilient member moves the restriction member to the movement start position at which releasing of the restriction of movement of the shift member toward the third shift position by the restriction member is started when movement of the detent pin to the release position is canceled. Further, when the shift member has been moved at the second shift position, the detent pin moves the restriction member away from the movement start position against the urging force (a resilient force) of the resilient member to release the restriction of movement of the shift member toward the third shift position by the restriction member, by the detent pin being moved from the non-release position toward the release position.

In the release section, without "moving the shift member from the first shift position to the second shift position, canceling the movement of the detent pin to the release position, and moving the detent pin back to the release position again" the restriction member accordingly cannot be moved to release the restriction of movement of the shift member toward the third shift position.

The shift device according to the aspects exhibits the excellent advantageous effect of enabling movement of the shift member from the second shift position to the third shift position to be restricted during operation of the shift member from the first shift position to the second shift position, even when the detent pin has been moved at the release position.

BRIEF DESCRIPTION OF THE DRAWINGS

Embodiments will be described in detail with reference to the following figures, wherein:

FIG. 6A is a side view showing relevant portions in a first assembly process, to explain an assembly method of the shift device shown in FIG. 1 and FIG. 2;

FIG. 6B is a side view showing relevant portions in a second assembly process;

FIG. 7 is a side view corresponding to FIG. 3, showing relevant portions of a shift device of a modified example of the first exemplary embodiment;

FIG. 24 is a side view corresponding to FIG. 23, showing relevant portions of a shift device to explain a second operation; and FIG. 25 is a side view corresponding to FIG. 23, showing relevant portions of a shift device to explain a third operation.

DETAILED DESCRIPTION

First Exemplary Embodiment

Figure 1:
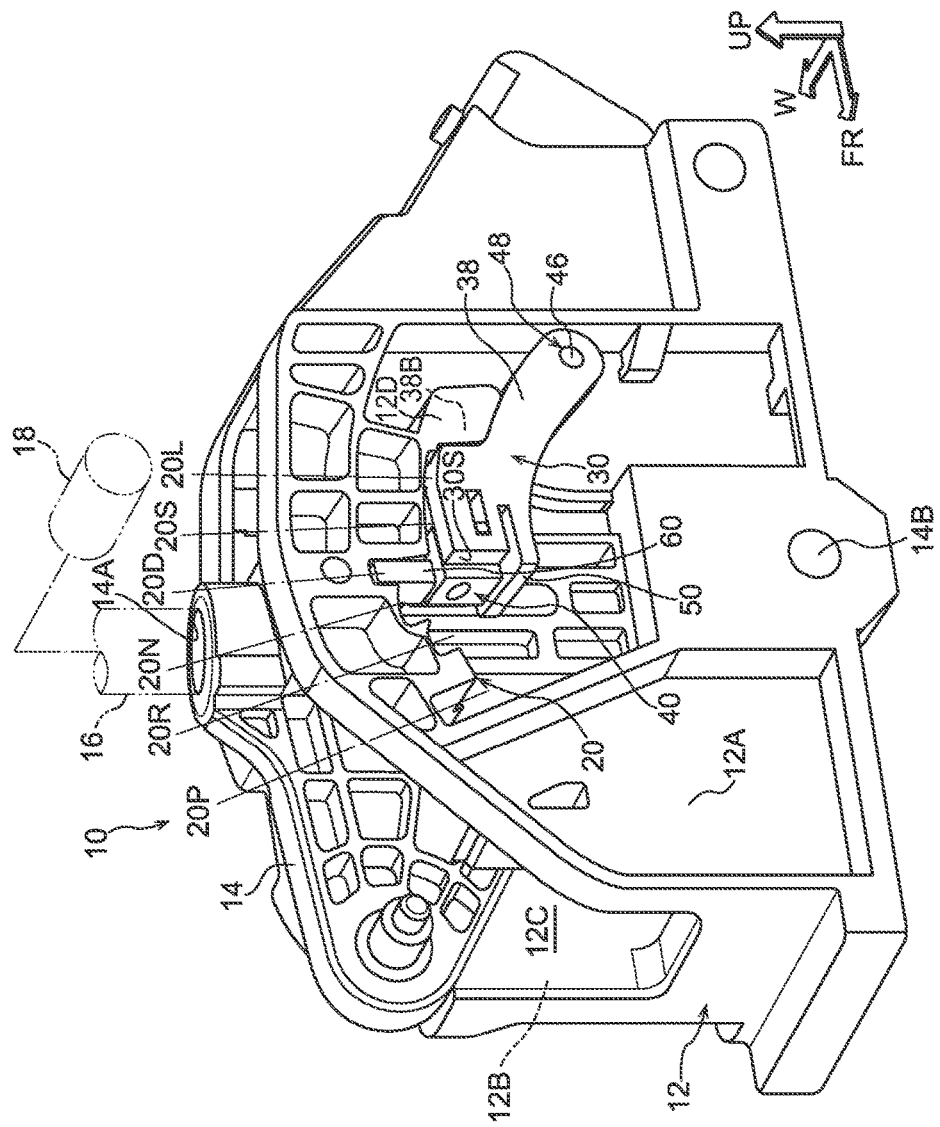
FIG. 1 is a perspective view showing a shift device according to a first exemplary embodiment, viewed toward the vehicle rear side along a diagonal direction at the vehicle front side.

Explanation follows regarding a shift device 10 according to a first exemplary embodiment applied to a vehicle such as an automobile, with reference to FIG. 1 to FIG. 7. Note that in the drawings, the arrow FR indicates the vehicle front direction, and the arrow W indicates the vehicle width direction, as appropriate. The arrow UP indicates the vehicle upward direction. Note that there is no limitation to the direction in which the present invention is applied.

Overall Configuration of the Shift Device

Figure 2:
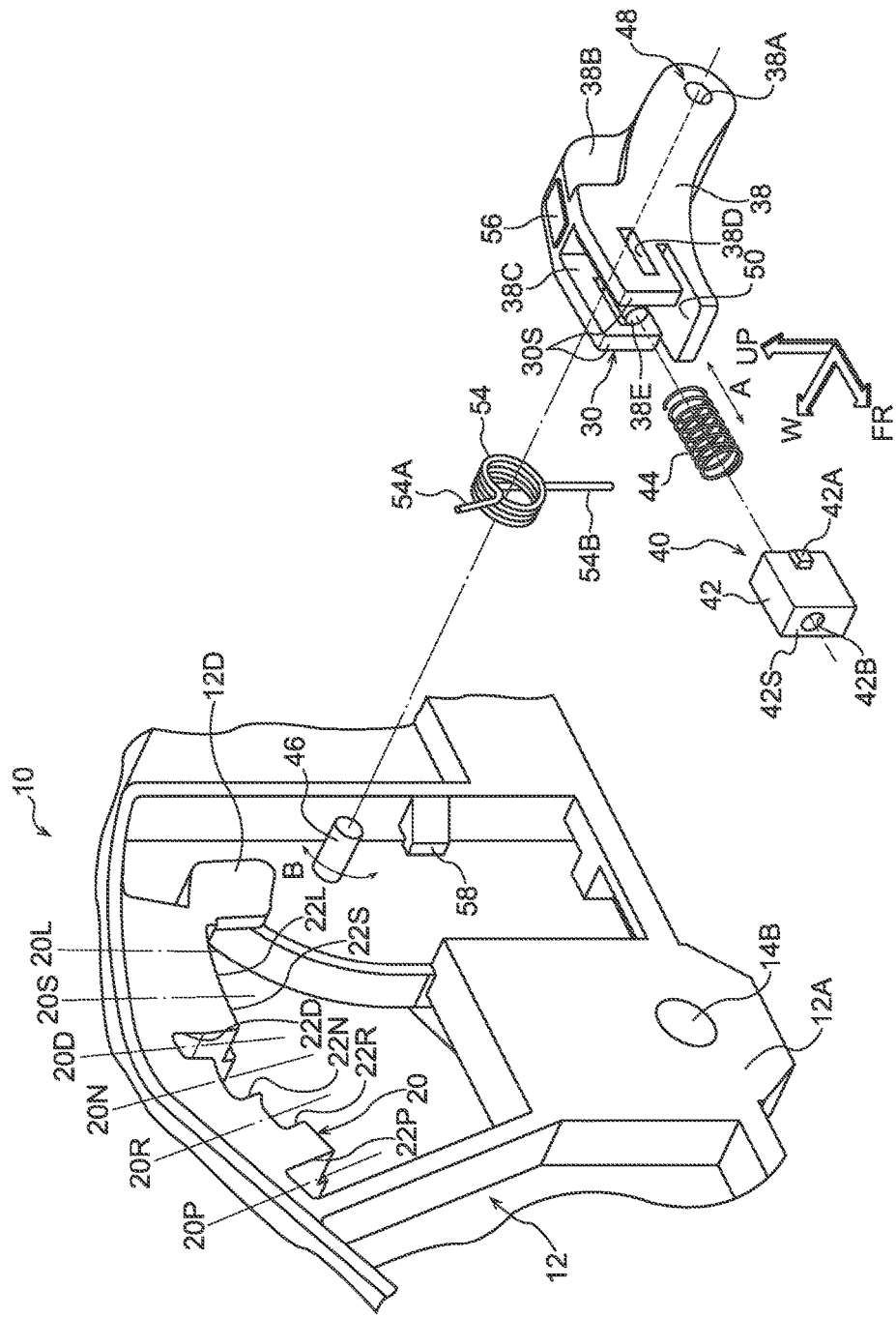
FIG. 2 is an exploded perspective view showing relevant portions of the shift device in FIG. 1.

As shown in FIG. 1 and FIG. 2, the shift device 10 according to the first exemplary embodiment is a floor-mounted type provided to a floor section of a vehicle, not shown in the drawings, and is a straight type automatic transmission shift device with a shift operation direction being in the vehicle front-rear direction. The shift device 10 includes the respective shift positions of a parking position 20P, a reverse position 20R, a neutral position 20N, which serve as a first shift position, a drive position 20D which serves as a second shift position, a second (second gear) position 20S and a low (low gear) position 20L, which serve as a third shift position. The respective shift positions are disposed contiguously, along a straight line from the vehicle front side (one side) toward the vehicle rear side (the other side). In the shift device 10, a third (third gear) position or a manual position may be disposed between the drive position 20D and the second gear position 20S. In such a case, the third position or the manual position configures the third shift position.

The shift device 10 includes a housing 12. The housing 12 is provided with a side face plate 12A and a side face plate 12B that are disposed facing each other with a separation therebetween in the vehicle width direction, and that are configured as flat planes in the vehicle front-rear direction and the vehicle up-down direction. A space section 12C which is such as like a recess is provided between the side face plate 12A and the side face plate 12B, and opens upward as viewed from the front of the vehicle.

Figure 3:
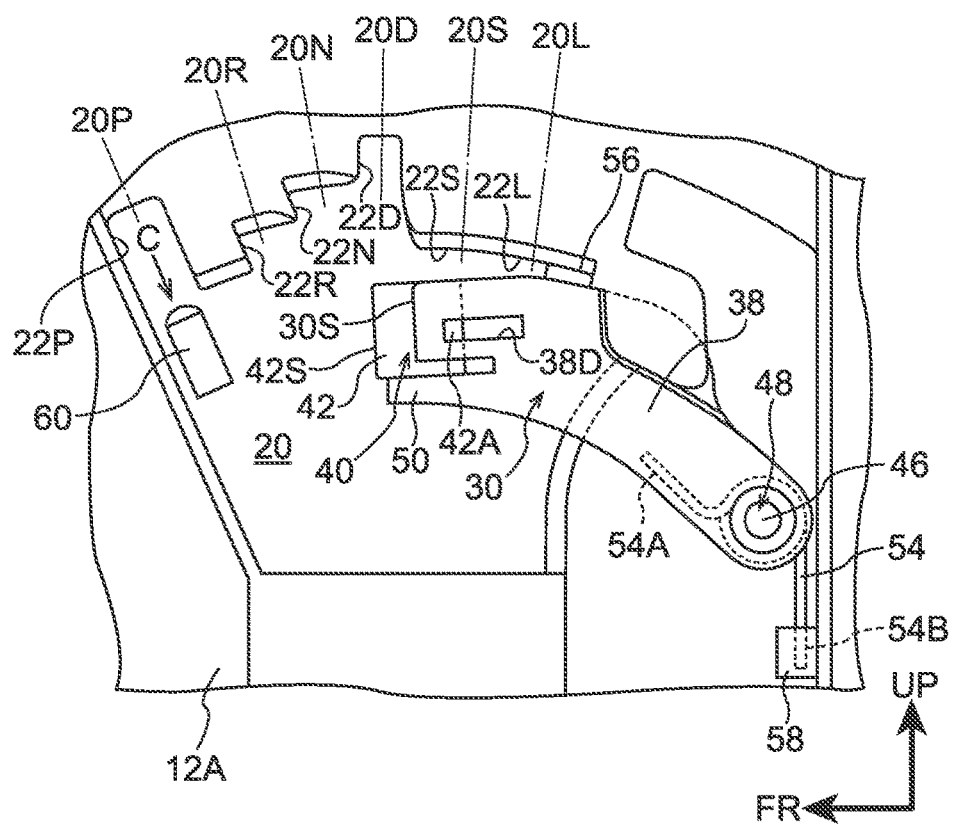
FIG. 3 is a side view viewed along a vehicle side face direction, and shows relevant portions of the shift device shown in FIG. 1 and FIG. 2 to explain a first operation.

In the space section 12C, a shift lever 16 serving as a shift member is capable of moving (capable of swinging) in the vehicle front-rear direction from the parking position 20P to the second gear position 20S, through the drive position 20D. A portion of the shift lever 16 is shown by an imaginary line (double-dotted intermittent line) in FIG. 1, and as an example, the shift lever 16 is formed in an elongated circular bar shape. A lower end portion of the shift lever 16 is inserted inside an opening 14A provided at an upper end portion of a lever support member 14, and is attached to the opening 14A. At a lower side intermediate portion of the housing 12, a lower end portion of the lever support member 14 is attached to a rotation shaft 14B configured with its axial direction in the vehicle width direction. The lever support member 14 is rotatable about the rotation shaft 14B as the axis of rotation. A shift knob, not shown in the drawings, is provided at an upper end portion of the shift lever 16. As shown in FIG. 1, the shift knob is provided with an operation button 18 to perform a fixing operation (locking operation) of the shift position and a release operation (unlocking operation) of the shift position. A detent pin 60 shown in FIG. 1 and FIG. 3 is caused to be disposed at a restrict position (non-release position: movement of the shift lever 16 is restricted) by the fixing operation (non-operation) of the operation button 18. The detent pin 60 is caused to be moved from the restrict position to a release position (restriction is released) by the release operation (press operation) of the operation button 18, as shown in FIG. 3.

As shown in FIG. 1 and FIG. 2, a detent plate section 20 is provided at a central location of the side face plate 12A of the housing 12. The detent plate section 20 is formed penetrating the side face plate 12A in the plate thickness direction. As shown in FIG. 2, disposition positions (placement positions) 22P, 22R, 22N, 22D, 22S, and 22L are provided to an upper portion of an inner wall of the detent plate section 20, which is penetrated.

The disposition position 22P is formed at the vehicle most front side in the disposition positions, and is recessed toward the vehicle upper side to configure a U-shaped groove as viewed from the side of the vehicle. The disposition position 22P is a location capable of fixing the detent pin 60 in the parking position 20P (so as to be capable of fixing the shift lever 16 in the parking position 20P). The disposition position 22R is formed adjacent to the disposition position 22P at the vehicle rear side, and is recessed toward the vehicle upper side to configure an L-shaped groove as viewed from the side of the vehicle. The disposition position 22R is a location capable of fixing the detent pin 60 in the reverse position 20R. The disposition position 22N is formed adjacent to the disposition position 22R at the vehicle rear side, and is more deeply recessed toward the vehicle upper side than the disposition position 22R, to configure an L-shaped groove as viewed from the side of the vehicle. The disposition position 22N is a location capable of fixing the detent pin 60 in the neutral position 20N. The disposition position 22D is formed adjacent to the disposition position 22N at the vehicle rear side, and is more deeply recessed toward the vehicle upper side than the disposition position 22N, to configure a U-shaped groove as viewed from the side of the vehicle. The disposition position 22D is a location capable of fixing the detent pin 60 in the drive position 20D. The disposition position 22S is formed adjacent to the disposition position 22D at the vehicle rear side, and the disposition position 22L is formed adjacent to the disposition position 22S at the vehicle rear side. The disposition position 22S and the disposition position 22L are more shallowly recessed toward the vehicle upper side than the disposition position 22D, and the disposition position 22S and the disposition position 22L are configured with a shape such that the two are connected together as viewed from the side of the vehicle. The disposition position 22S is a location capable of fixing the detent pin 60 in the second gear position 20S, and the disposition position 22L is a location capable of fixing the detent pin 60 in the low gear position 20L.

Note that in the present exemplary embodiment, the detent plate section 20 is only provided to the one side face plate 12A; however, a detent plate section may be provided to the face plate 12B on the other side, or detent plate sections may be provided to both side face plates.

Configuration of Restriction Member and Release Mechanism

As shown in FIG. 1 and FIG. 2, the shift device 10 is configured including a restriction member 30 and a release section (release mechanism) 40. The restriction member 30 and the release section 40 configure a rotating mechanical unit that restricts movement of the shift lever 16 from the drive position 20D to the second gear position 20S during operation of the shift lever 16 from the parking position 20P to the drive position 20D, even when the detent pin 60 has been moved at a release position. Namely, in the present exemplary embodiment, the restriction member 30 and the release section 40 restrict the shift lever 16 from skipping the drive position 20D.

The restriction member 30 is formed by a rotation arm 38, the rotation arm 38 (the restriction member 30) including walls (faces) 30S. The wall 30S are provided below the disposition position 22D at the drive position 20D (see FIG. 3), and are provided at one end portion at the vehicle front side at the rotation arm 38. The walls 30S are aligned in the vehicle up-down direction (in the axial direction of the shift lever 16 at the drive position 20D) with an inner wall face at the vehicle rear side of the U-shaped groove of the disposition position 22D in a state (mentioned below) in which the rotation arm 38 is not moved (rotated) downward by the detent pin 60. (In other words, positions of the walls 30S are coincidence with position of the inner wall face at the vehicle rear side of the U-shaped groove of the disposition position 22D when viewed along the vehicle up-down direction.) More specifically, the rotation arm 38 is formed in a circular arc shape bulging toward the vehicle upper side as viewed from the side of the vehicle. A guide portion 38C is provided at one end portion at the vehicle front side of the rotation arm 38, and the guide portion 38C is configured in a bifurcated (forked) U-shape, open toward the vehicle front side in plan view of the vehicle. The two vehicle front side end walls of the fork configure the walls 30S. In other words, the walls 30S are formed by utilizing a portion of the rotation arm 38, or with being integrally with the rotation arm 38. The restriction member 30 stops the detent pin 60 that is in a release position (when the detent pin 60 is at the release position, there is a state in which movement from the parking position 20P to the drive position 20D is enabled by the release operation of the operation button 18) at the drive position 20D, thereby restricting movement toward the second gear position 20S.

The restriction member 30 is configured such that, in movement of the detent pin 60 toward the drive position 20D from the reverse position 20R or the neutral position 20N, the detent pin 60 is also stopped at the drive position 20D in a similar manner. The restriction member 30 is also configured so as to restrict movement toward the low gear position 20L that is further to the vehicle rear side than the second gear position 20S.

As shown in FIG. 1 and FIG. 2, the release section 40 includes a movable member 42 and a movement section (movement mechanism) 48. In the present exemplary embodiment, the movable member 42 is formed from a rectangular parallelopiped block made from resin, and is positioned at an intermediate portion between the bifurcated fork of the guide portion 38C of the rotation arm 38. A guide hole 42B that is guided is provided at the movable member 42 so as to penetrate the movable member 42 from the vehicle front side to the vehicle rear side. A guidance rod 38E that is integrally formed to the guide portion 38C and that is disposed with its axial direction in the vehicle front-rear direction at the intermediate portion of the guide portion 38C is inserted through the guide hole 42B. Side face portions of the guide portion 38C which face each other and are forked portions are provided with respective elongated restricting holes 38D that have length direction in the vehicle front-rear direction, and that restrict a guidance range (in the direction) of the movable member 42. Restricting projections 42A provided to both respective vehicle width direction side faces of the movable member 42 are positioned inside the elongated restricting holes 38D, to give a configuration in which the movable member 42 is guided by the guide portion 38C, and slides along the arrow A direction, this being the vehicle front-rear direction, within the range of the elongated restricting holes 38D.

A resilient member 44 is provided to the guidance rod 38E between the movable member 42 and the guide portion 38C. A coil spring, for example, is employed (used) as the resilient member 44. The resilient member 44 imparts an urging (namely, pressing) force toward the vehicle front side (the one side) to the movable member 42. Configuration is made such that, when the movable member 42 is urged (namely, pressed) toward the vehicle front side (without being pressed by the detent pin 60 toward vehicle rear side), the movable member 42 projects out further to the vehicle front side than the walls 30S of the restriction member 30, but the movable member 42 is restricted by the elongated restricting holes 38D, thus, the movable member 42 moves to (is positioned at) a position where the movable member 42 closes (blocks) the disposition position 22D at the drive position 20D (see FIG. 3). When the detent pin 60 which is in the release position (see FIG. 3) moves from the parking position 20P toward the drive position 20D, a vehicle front side wall (face) 42S of the movable member 42 is pressed by the detent pin 60. The wall 42S of the movable member 42 then moves toward the vehicle rear side against the urging force of the resilient member 44, until aligned with the walls 30S of the restriction member 30. When the pressing of the detent pin 60 is released, the resilient member 44 moves the movable member 42 back from the moved position to its original position closing the disposition position 22D. Namely, the movable member 42 is capable of moving with respect to the restriction member 30 in a movement direction of the detent pin 60 (the vehicle rear direction) accompanying movement of the shift lever 16 from the parking position 20P toward the drive position 20D. Movement of the movable member 42 with respect to the restriction member 30 is restricted in a movement direction of the detent pin 60 toward the release position (the vehicle downward direction).

The movement section 48 includes a rotation shaft hole 38A provided at another end portion at the vehicle rear side of the rotation arm 38, a rotation shaft 46 fitted into the rotation shaft hole 38A, and a resilient member 54. The rotation shaft 46 is integrally formed to the side face plate 12A at a position further to the vehicle rear side than the detent plate section 20, and is formed projecting out with its axial direction in the vehicle width direction. The rotation arm 38 is thus configured to turn about the rotation shaft 46 along the arrow B direction, this being substantially the vehicle up-down direction.

As shown in FIG. 2 and FIG. 3, the resilient member 54 is provided to the rotation shaft 46 between the rotation arm 38 and the side face plate 12A. A torsion coil spring (torsion spring), for example, is employed as the resilient member 54. One end 54A of the resilient member 54 is attached to the rotation arm 38, and another end 54B is attached to a hook shaped engagement portion 58 that is integrally formed to the side face plate 12A. The resilient member 54 imparts a urging force to the rotation arm 38, causing an upper face of the guide portion 38C to abut a location of the detent plate section 20 at the disposition position 22S and the disposition position 22L. When, in the drive position 20D, the detent pin 60 moves in the vehicle downward direction from the disposition position 22D (the non-release position) toward the release position, the detent pin 60 presses the upper face of the movable member 42, and the rotation arm 38 is pushed downward via the movable member 42 (is turned in the arrow B direction). At this pushed-down position, the restriction of movement of the detent pin 60 toward the second gear position 20S by the restriction member 30 is released. Namely, when the rotation arm 38 is pushed down, a space allowing movement of the detent pin 60 is formed between the guide portion 38C of the rotation arm 38 and the disposition position 22S at the second gear position 20S. Movement of the detent pin 60 from the drive position 20D to the respective shift positions of the second gear position 20S and the low gear position 20L is then enabled.

Accordingly, the release section 40 is configured such that, by movement of the detent pin 60 from the disposition position 22D at the drive position 20D to the release position, the restriction by the restriction member 30 of movement of the detent pin 60 toward the second gear position 20S is mechanically released.

A recess portion 38B is provided at an upper portion of an intermediate portion in the vehicle front-rear direction of the rotation arm 38, which is formed so as to cut away a portion of a vehicle width direction outside portion. A protrusion portion 12D is integrally formed to the side face plate 12A at a location of the side face plate 12A corresponding to the recess portion 38B, and the protrusion portion 12D projects toward the vehicle lower side as viewed from the side of the vehicle, so as to overlap with (enter in) the recess portion 38B. Although the assembly method will be explained in detail later, put briefly, the recess portion 38B fits between the protrusion portion 12D and the side face plate 12A, and the restriction member 30 and the release section 40 are attached to the housing 12 by assembling the rotation arm 38 to the side face plate 12A. Note that at this time the recess portion 38B is capable of sliding with respect to the protrusion portion 12D accompanying moving of the rotation arm 38.

As shown in FIG. 1 to FIG. 3, a plate shaped support portion 50 is integrally formed to a lower portion of the guide portion 38C of the rotation arm 38. The support portion 50 projects out further toward the vehicle front side than the walls 30S, and abuts a lower face of the movable member 42, so as to support the movable member 42. The support portion 50 is configured to support the movable member 42, and to disperse load imparted to the movable member 42 due to being pressed by the detent pin 60.

As shown in FIG. 2 and FIG. 3, at the upper portion of the rotation arm 38, more specifically, at the upper portion between the recess portion 38B and the guide portion 38C, a shock absorber 56 is provided. The shock absorber 56 is configured to suppress sound generation when the rotation arm 38 abuts the detent plate section 20 as the rotation arm 38 is returned to the movement restricting position at which movement of the detent pin 60 toward the second gear position 20S or the low gear position 20L is restricted from movement-restricting release position by the resilient member 54. The shock absorber 56 is, for example, formed from a material softer than the material of the rotation arm 38, more specifically, a fiber, rubber, resin, or the like, and is insert molded to the rotation arm 38, or is attached to the rotation arm 38 as a separate component using an adhesive or adhesive tape. Note that the shock absorber 56 may also be provided on the detent plate section 20 side, or may be provided to both the rotation arm 38 and the detent plate section 20.

Shift Device Operation

Next, explanation follows regarding operation of the shift device 10 according to the present exemplary embodiment, with reference to FIG. 1 to FIG. 5. In the shift device 10, first, the driver performs the release operation using the operation button 18 of the shift knob, not shown in the drawings. The release operation releases fixing of the detent pin 60 in the placement position 22P at the parking position 20P, and, as shown in FIG. 3, the detent pin 60 moves in the arrow C direction toward the release position.

Figure 4:
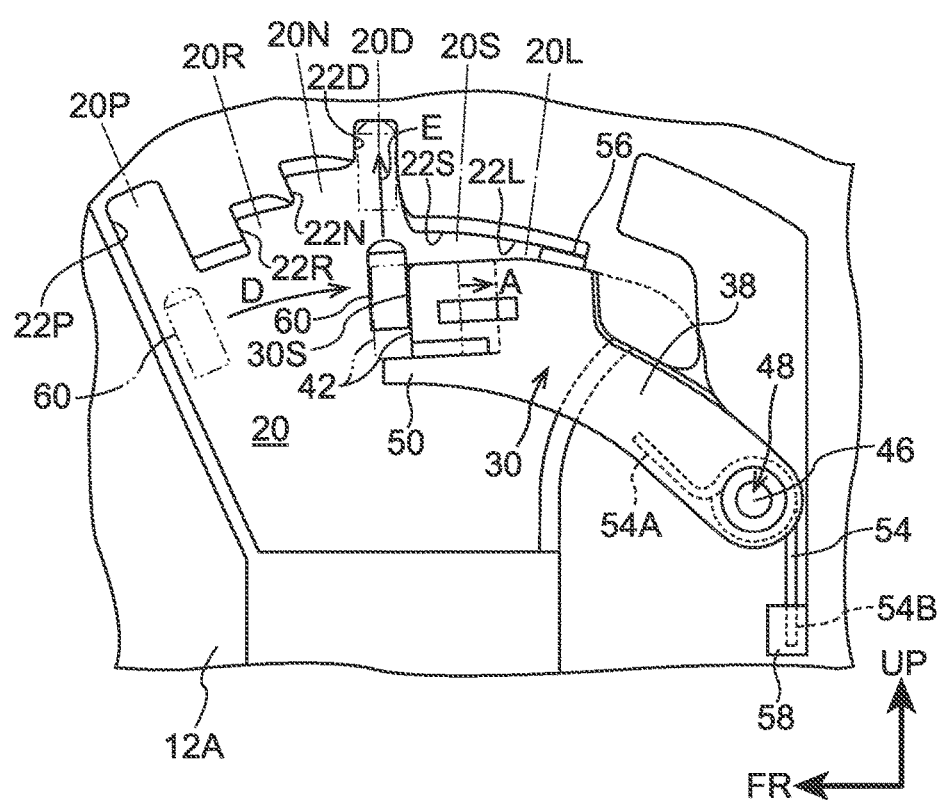
FIG. 4 is a side view corresponding to FIG. 3, showing relevant portions of a shift device to explain a second operation.

In order to select the drive mode and drive the vehicle forward, the driver moves the shift lever 16 in the arrow D direction (toward the vehicle rear side) toward the drive position 20D as shown in FIG. 4, while continuing the release operation. Due to this movement of the shift lever 16, the detent pin 60 positioned at the release position abuts the wall 42S of the movable member 42 of the restriction member 30, and presses the wall 42S, thereby pushing and moving the movable member 42 in the arrow A direction, against the urging force of the resilient member 44 (see FIG. 2). Due to this movement of the movable member 42, then, the detent pin 60 abuts the walls 30S of the restriction member 30 and therefore is stopped at the drive position 20D by the walls 30S. Namely, movement of the detent pin 60 toward the respective shift positions of the second gear position 20S and the low gear position 20L is restricted. Movement of the detent pin 60 is also restricted in a similar manner when the shift lever 16 is moved from the reverse position 20R and the neutral position 20N respectively to the drive position 20D.

Figure 5:
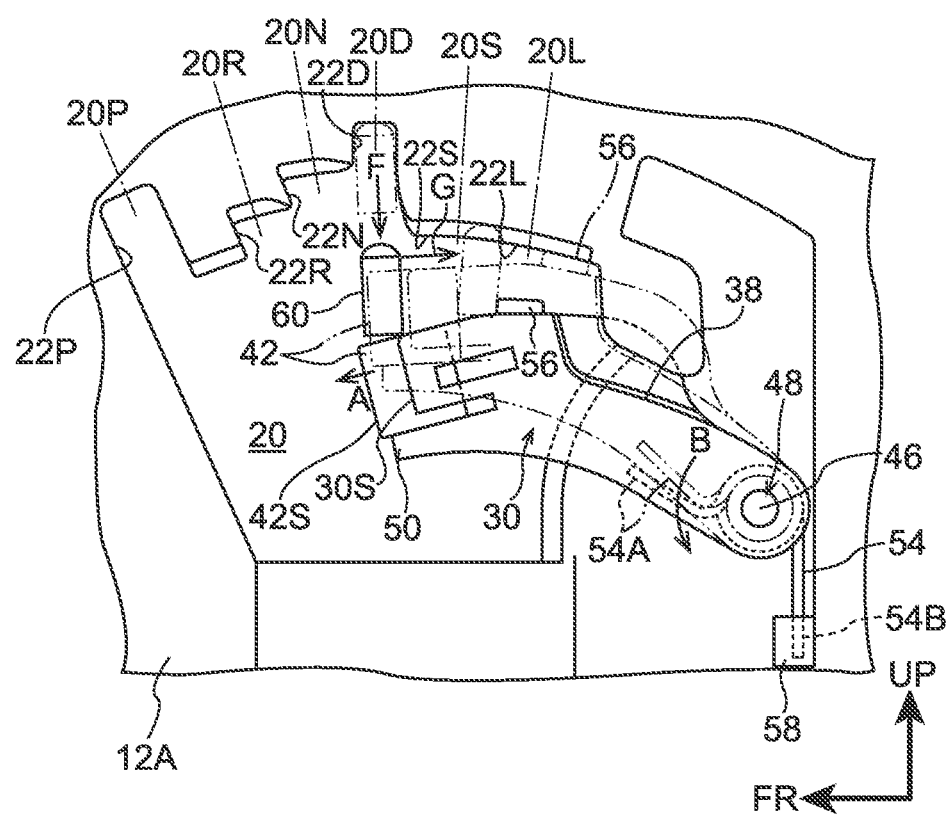
FIG. 5 is a side view corresponding to FIG. 3, showing relevant portions of a shift device to explain a third operation.

The driver ends the release operation of the operation button 18 and performs the fixing operation. By the fixing operation, as shown by double-dotted intermittent lines in FIG. 4, the detent pin 60 is moved in the arrow E direction toward the disposition position 22D at the drive position 20D, and is fixed. Note that when the detent pin 60 moves in the arrow E direction from the release position toward the disposition position 22D, the pressing of the wall 42S by the detent pin 60 ends, and the movable member 42 is accordingly returned from the moved position to its original position by the urging force of the resilient member 44, as shown in FIG. 5 (movement of the movable member 42 is released).

From the drive mode, in order to select a second gear mode and change the forward drive gear ratio of the vehicle, the driver uses the operation button 18 of the shift knob to perform the release operation again. As shown in FIG. 5, by the release operation, the detent pin 60 is moved in the arrow F direction from the disposition position 22D (from the non-release position side) toward the release position. Due to this movement of the detent pin 60, the detent pin 60 presses the upper face of the movable member 42, which is returned its original position, and pushes the rotation arm 38 in the vehicle downward direction via the movable member 42. Namely, the rotation arm 38 turns about the rotation shaft 46 as center in the arrow B direction, and the restriction member 30 and the walls 30S thereof move toward the vehicle lower side. Due to the movement of the restriction member 30, a space is formed allowing movement of the detent pin 60 in the arrow G direction between the disposition position 22S at the second gear position 20S and the disposition position 22L at the low gear position 20L, and the upper face of the rotation arm 38. Namely, the restriction of movement to the shift positions of the second gear position 20S and a gear position (the low gear position 20L) which is at the vehicle rear side than the second gear position 20S is released. In the disposition position 22S at the second gear position 20S, the driver ends the release operation of the operation button 18 and performs the fixing operation. The shift lever 16 is thereby disposed in the second gear position 20S. Note that the neutral mode, the reverse mode, or the parking mode can be selected after selecting the drive mode, without selecting the second gear mode or the low gear mode.

Assembly Method of Restriction Member and Release Mechanism

Simple explanation follows regarding an assembly method of the restriction member 30 and the release section 40 of the shift device 10 according to the present exemplary embodiment, with reference to FIG. 6A and FIG. 6B. First, the restriction member 30 is prepared. As shown in FIG. 1 to FIG. 3, the restriction member 30 is in a state in which the movable member 42 has been assembled to the guide portion 38C of the rotation arm 38 via the resilient member 44.

Next, the resilient member 54 is attached to the rotation shaft 46 of the release section 40 provided to the side face plate 12A. Then, as shown in FIG. 6A, the rotation arm 38 is positioned slightly further to the vehicle lower side than the protrusion portion 12D provided to the side face plate 12A, and the rotation shaft hole 38A (see FIG. 2) of the rotation arm 38 is fitted over the rotation shaft 46 with the resilient member 54 being therebetween. The recess portion 38B of the rotation arm 38 is then fitted at a position further to the vehicle width direction inside than the protrusion portion 12D, thereby assembling the restriction member 30 and the release section 40 to the side face plate 12A. This assembly does not require any fastening members such as screws, bolts, or the like.

Operation and Advantageous Effects of the First Exemplary Embodiment

In the shift device 10 according to the present exemplary embodiment, as shown in FIG. 1 and FIG. 2, the shift lever 16 is capable of moving from the parking position 20P to the second gear position 20S, through the drive position 20D. The shift lever 16 is provided with the detent pin 60, as shown in FIG. 3. By being moved to the release position, the detent pin 60 is capable of moving from the parking position 20P toward the drive position 20D.

The shift device 10 includes the restriction member 30 and the release section 40. As shown in FIG. 4, during movement of the shift lever 16 from the parking position 20P to the drive position 20D, the restriction member 30 stops the detent pin 60 that has been moved at the release position, thereby restricting movement of the shift lever 16 toward the second gear position 20S. Moreover, as shown in FIG. 5, when the shift lever 16 is at the drive position 20D (when the shift lever 16 has been moved at the drive position 20D), the release section 40 causes, by movement of the detent pin 60 from the disposition position 22D toward the release position, to release "the restriction by the restriction member 30" of movement of the shift lever 16 toward the second gear position 20S.

Therefore, when the detent pin 60 has been moved at the release position, it is possible that the shift lever 16 is stopped at the drive position 20D when moving from the parking position 20P and it is also possible that the release section 40 causes the shift lever 16 that has been moved at the drive position 20D to be moved to the second gear position 20S.

In the shift device 10 according to the present exemplary embodiment, movement of the shift lever 16 from the drive position 20D to the second gear position 20S can be restricted in operation of the shift lever 16 from the parking position 20P to the drive position 20D, even when the detent pin 60 has been moved at the release position. Namely, the shift device 10 according to the present exemplary embodiment enables skipping the drive position 20D to be restricted.

In the shift device 10 according to the present exemplary embodiment, the restriction member 30 and the release section 40 operate mechanically accompanying movement of the detent pin 60. Namely, a configuration that is electrically or mechanically coupled to operation of a brake pedal is not required.

In the shift device 10 according to the present exemplary embodiment, as shown in FIG. 1 and FIG. 2, the release section 40 includes the movable member 42 and the movement section 48. As shown in FIG. 3 and FIG. 4, during movement of the shift lever 16 from the parking position 20P to the drive position 20D, the detent pin 60 that has been moved at the release position moves the movable member 42. Moreover, as shown in FIG. 5, when the shift lever 16 has been moved at the drive position 20D (is positioned at the drive position 20D) and when the movement of the detent pin 60 to the release position is released, the movement of the movable member 42 is released. As shown in FIG. 5, when the shift lever 16 has been moved at the drive position 20D (is positioned at the drive position 20D), the movement section 48 causes, by movement of the detent pin 60 toward the release position, to move the restriction member 30 via the movable member 42, thereby releasing the restriction of movement of the shift lever 16 toward the second gear position 20S. Namely, without "moving the shift lever 16 from the parking position 20P to the drive position 20D, then releasing the detent pin 60 from the release position, and thereafter moving the detent pin 60 back to the release position again", the release section 40 cannot perform that the restriction member 30 is moved to release the restriction of movement of the shift lever 16 toward the second gear position 20S.

In the shift device 10 according to the present exemplary embodiment, as shown in FIG. 2 and FIG. 4, the movable member 42 is movable with respect to the restriction member 30 in the movement direction of the detent pin 60 (the vehicle rear direction or the arrow A direction) accompanying movement of the shift lever 16 from the parking position 20P to the drive position 20D. Since the detent pin 60 that has been moved at the release position moves the movable member 42 and is stopped at the restriction member 30, movement of the shift lever 16 toward the second gear position 20S is restricted when movement of the shift lever 16 from the parking position 20P to the drive position 20D. On the other hand, as shown in FIG. 5, movement of the movable member 42 with respect to the restriction member 30 is restricted in the movement direction of the detent pin 60 toward the release position (vehicle downward direction). Accordingly, by the movement of the detent pin 60 toward the release position, the restriction member 30 is moved via the movable member 42 that is movement-restricted in this movement direction with respect to the restriction member 30, thereby releasing the restriction of movement of the shift lever 16 toward the second gear position 20S.

As shown in FIG. 2 and FIG. 5, in the shift device 10 according to the present exemplary embodiment, the movement section 48 is configured so as to turn the restriction member 30. More specifically, the movement section 48 includes the rotation shaft 46 integrally provided to the side face plate 12A, the rotation shaft hole 38A provided at the another end portion of the rotation arm 38 of the restriction member 30, and the resilient member 54 provided to the rotation shaft 46. There are few components, due to forming the movement section from three main configuration elements, thereby enabling a simple configuration for the movement section 48.

As shown in FIG. 1 and FIG. 2, in the shift device 10 according to the present exemplary embodiment, the rotating mechanical unit that restricts skipping is configured from a total of five configuration elements, namely the restriction member 30, the movable member 42, the movement section 48, and the two elements of the resilient member 44 and resilient member 54. The number of components is accordingly small, thereby enabling a simple configuration for the rotating mechanical unit.

As shown in FIG. 2, in the shift device 10 according to the present exemplary embodiment, the movable member 42 of the release section 40 is configured that it moves by sliding. More specifically, the movable member 42 is configured from the three main configuration elements of the guide hole 42B provided to the movable member 42, the guidance rod 38E integrally provided to the guide portion 38C, and the resilient member 44 provided to the guidance rod 38E. This thereby enables a simple configuration for the release section 40.

In the shift device 10 according to the present exemplary embodiment, as shown in FIG. 2 to FIG. 5, the restriction member 30 is provided with the support portion 50 that supports the movable member 42. The support portion 50 receives load due to the movement of the detent pin 60 which is at the drive position 20D from the disposition position 22D toward the release position via the movable member 42. Load imparted to the movable member 42 is accordingly distributed (dispersed) to the support portion 50, enabling an increase in durability of the restriction member 30. Note that the support portion 50 also acts to restrict movement of the movable member 42 with respect to the restriction member 30 in the movement direction of the detent pin 60 toward the release position.

In the shift device 10 according to the present exemplary embodiment, as shown in FIG. 2 to FIG. 5, the restriction member 30 is provided with the shock absorber 56. When the detent pin 60 which is fixed (positioned) at the second gear position 20S or the low gear position 20L is moved to the drive position 20D or the like, the restriction member 30 is returned to the movement restricting position at which movement of the detent pin 60 toward the second gear position 20S or the low gear position 20L is restricted from the movement-restricting release position by the urging force of the resilient member 54. When this occurs, the restriction member 30 abuts the inner wall of the detent plate section 20. However, the shock absorber 56 enables the generation of sound by this abutting to be suppressed.

Modified Example

Explanation follows regarding a shift device 10 according to a modified example of the first exemplary embodiment, with reference to FIG. 7. In the shift device 10 according to the modified example, as shown in FIG. 7, a movable member 70 is provided in place of the movable member 42 of the release section 40. A vehicle front side face of the movable member 70 configures a wall 70S that is abutted by the detent pin 60, and the movable member 70 turns (moves) in the arrow H direction about a rotation shaft 72 provided to the support portion 50. By a resilient member, not shown in the drawings, the movable member 70 that has moved (rotated) at the arrow H direction is returned to the drive position 20D. Rotational movement of the movable member 70 is different from slide movement, but the movable member 70 exhibits similar operation to the movable member 42 described above.

The shift device 10 according to the modified example enables similar operation and advantageous effects to the operation and advantageous effects obtained by the shift device 10 according to the first exemplary embodiment.

Second Exemplary Embodiment

Next, explanation follows regarding a shift device 80 according to a second exemplary embodiment, with reference to FIG. 8 to FIG. 13. Note that in the second exemplary embodiment and subsequent exemplary embodiments, configuration elements similar to configuration elements previously described are allocated the same reference numerals, and duplicate explanation regarding similar configuration elements is omitted.

Overall Configuration of Shift Device

Figure 8:
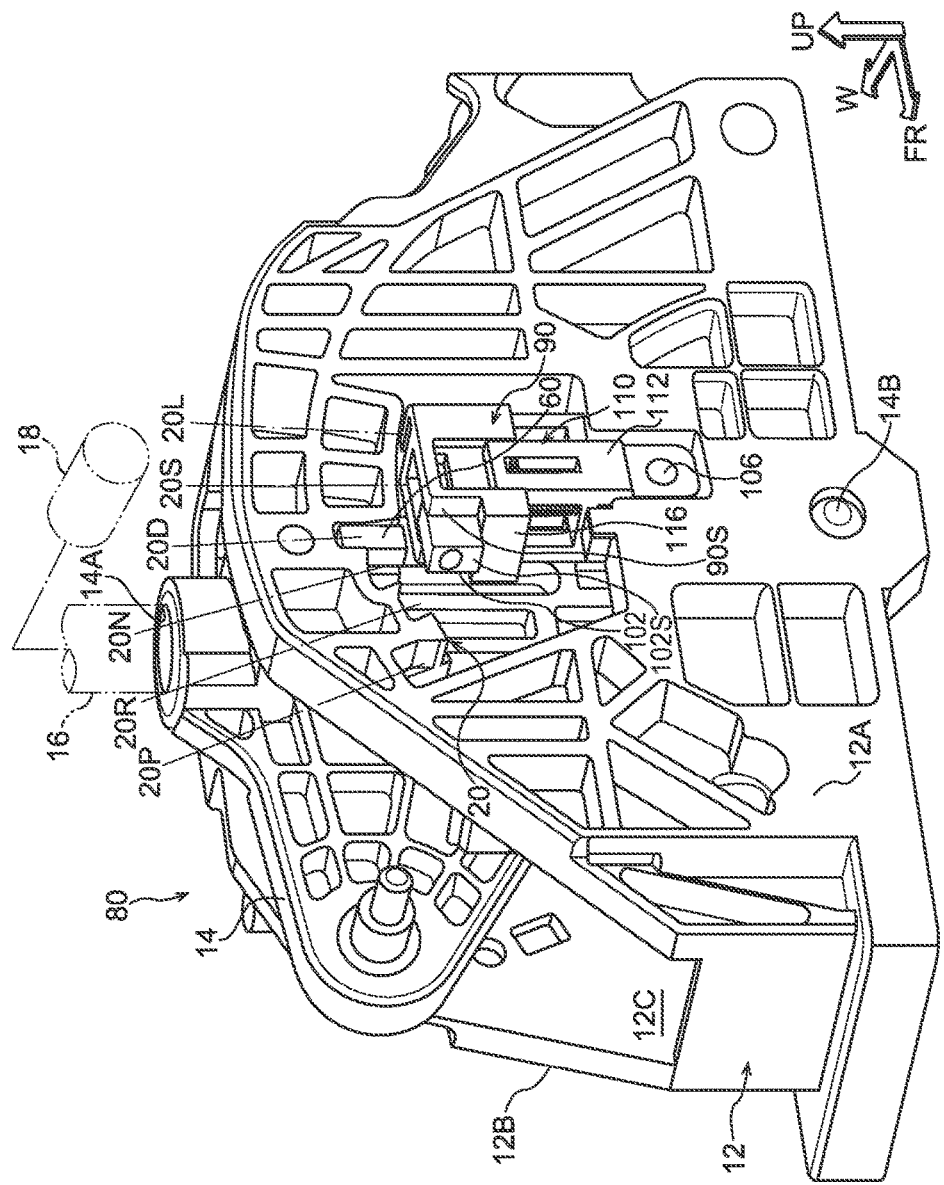
FIG. 8 is a perspective view corresponding to FIG. 1, showing a shift device according to a second exemplary embodiment.

The shift device 80 according to the present exemplary embodiment shown in FIG. 8 has substantially the same configuration as the configuration of the shift device 10 according to the first exemplary embodiment shown in FIG. 1 and FIG. 2, with the exception of the restriction member 30 and the release section 40. The shift device 80 according to the present exemplary embodiment is provided with a restriction member 90 and a release section 100 in place of the restriction member 30 and the release section 40. The restriction member 90 and the release section 100 configure a sliding mechanical unit that restricts movement of the shift lever 16 from the drive position 20D to the second gear position 20S during operation of the shift lever 16 from the parking position 20P to the drive position 20D, even when the detent pin 60 has been moved at the release position. Namely, in the present exemplary embodiment, the restriction member 90 and the release section 100 are configured so as to restrict the shift lever 16 from skipping the drive position 20D.

Restriction Member and Release Mechanism Configuration

Figure 9:
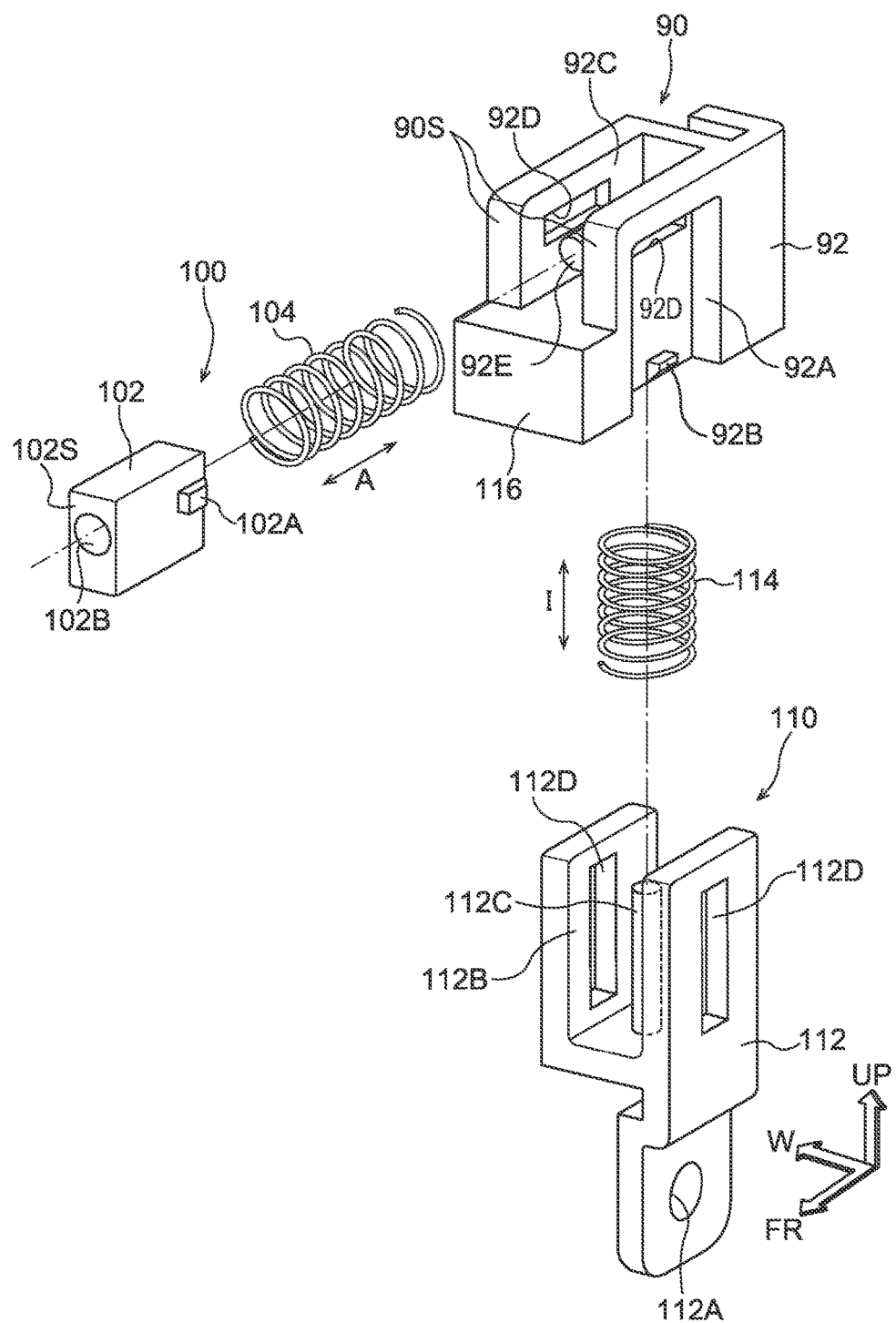
FIG. 9 is an exploded perspective view showing relevant portions of the shift device in FIG. 8.
Figure 10:
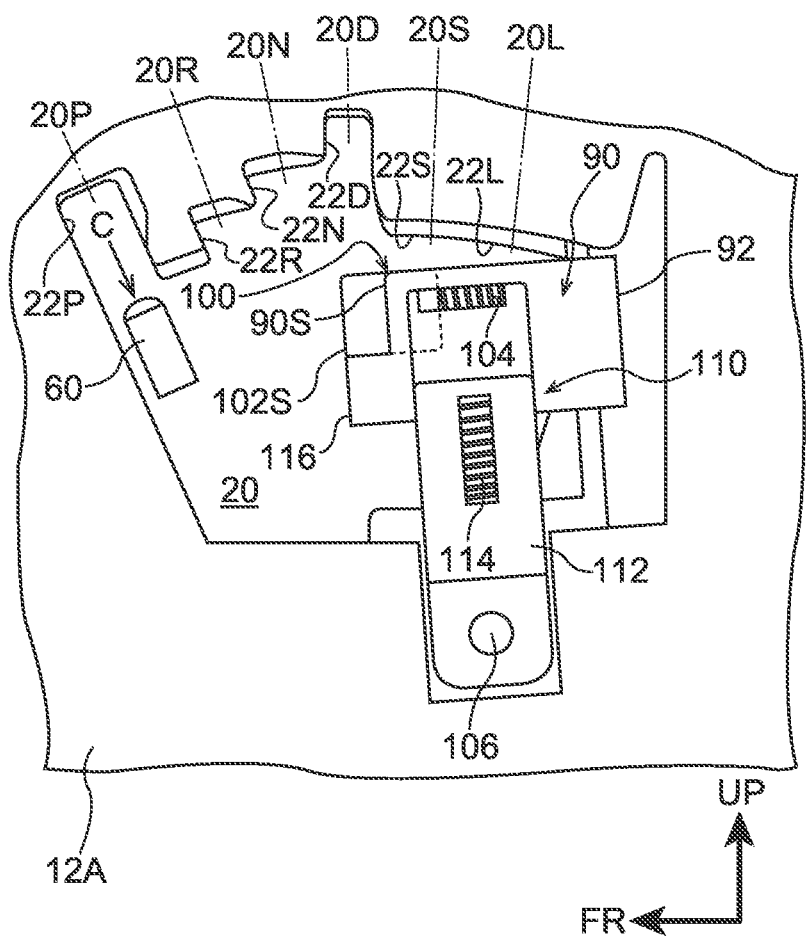
FIG. 10 is a side view viewed along a vehicle side face direction, and shows relevant portions of the shift device shown in FIG. 8 and FIG. 9 to explain a first operation.

As shown in FIG. 8 to FIG. 10, similarly to the restriction member 30 described above, the restriction member 90 of the shift device 80 is formed by a slider 92. Walls 90S are provided at the slider 92 at one end portion at the vehicle front side. The walls 90S are aligned in the vehicle up-down direction (in the axial direction of the shift lever 16 at the drive position 20D) with the inner wall face at the vehicle rear side of the disposition position 22D. More specifically, the slider 92 is formed from a rectangular parallelopiped resin block. A guide portion 92C is provided at one end portion on the vehicle front side of the slider 92, and the guide portion 92C is configured in a bifurcated (forked) U-shape open toward the vehicle front side in plan view of the vehicle. The two vehicle front side end walls of this fork configure the walls 90S. In other words, the walls 90S are formed by utilizing a portion of the slider 92, or with being integrally with the slider 92. The restriction member 90 stops the detent pin 60 that is in a release position (when the detent pin 60 is at the release position, there is a state in which movement from the parking position 20P to the drive position 20D is enabled by the release operation of the operation button 18) at the drive position 20D, thereby restricting movement toward the second gear position 20S.

As shown in FIG. 8 and FIG. 9, the release section 100 includes a movable member 102 and a movement section (movement mechanism) 110. In the present exemplary embodiment, the movable member 102 is formed from a rectangular parallelopiped resin block, and is positioned at an intermediate portion between the bifurcated fork of the guide portion 92C at a vehicle front side end portion of the slider 92. A guide hole 102B that is guided penetrates the movable member 102 from the vehicle front side to the vehicle rear side. A guidance rod 92E that is integrally formed to the guide portion 92C and that has axial direction in the vehicle front-rear direction at the intermediate portion of the guide portion 92C is inserted through the guide hole 102B. Side face portions of the guide portion 92C which face each other and are forked portions are provided with respective elongated limiter holes (restricting holes) 92D that have length direction in the vehicle front-rear direction, and that restrict a guidance range in the direction of the movable member 102. Limiter projections (restricting projections) 102A provided to both respective vehicle width direction side faces of the movable member 102 are positioned inside the elongated limiter holes 92D, to give a configuration in which the movable member 102 is guided by the guide portion 92C, and slides along the arrow A direction, this being the vehicle front-rear direction, within the range of the elongated limiter holes 92D.

A resilient member 104 is provided to the guidance rod 92E between the movable member 102 and the guide portion 92C. A coil spring, for example, is employed as the resilient member 104. Urging force of the resilient member 104 toward the vehicle front side acts on the movable member 102. When the movable member 102 is urged toward the vehicle front side (without being pressed by the detent pin 60 toward vehicle rear side), the movable member 102 projects out further to the vehicle front side than the walls 90S of the restriction member 90, but the movable member 102 is restricted by the elongated restricting holes 92D, thus, the movable member 102 moves to (is positioned at) a position closing the disposition position 22D at the drive position 20D (see FIG. 10). When the detent pin 60 in the release position moves from the parking position 20P toward the drive position 20D (see FIG. 10), a vehicle front side wall (face) 102S of the movable member 102 is pressed by the detent pin 60. The wall 102S of the movable member 102 then moves toward the vehicle rear side against the urging force of the resilient member 104, until aligned (being coincidence) with the walls 90S of the restriction member 90. When pressing by the detent pin 60 is released, the resilient member 104 moves the movable member 102 back from the moved position to its original position where it closes the disposition position 22D. Namely, the movable member 102 is capable of moving with respect to the restriction member 90 in the movement direction of the detent pin 60 (the vehicle rear direction) accompanying movement of the shift lever 16 from the parking position 20P toward the drive position 20D. Movement of the movable member 102 with respect to the restriction member 90 is restricted in the movement direction of the detent pin 60 toward the release position (the vehicle downward direction).

As shown in FIG. 8 and FIG. 9, the movement section 110 includes recess shaped slide grooves 92A open toward the vehicle lower side at both vehicle width direction side portions of a vehicle front-rear direction intermediate portion of the slider 92, a support member 112 that fits together with the slide grooves 92A and moves the slider 92 by sliding along the arrow I direction, this being the vehicle up-down direction, and a resilient member 114. The support member 112 is formed in a y-shape with a bifurcated fork open toward the vehicle upper side as viewed from the front of the vehicle, and with extending toward the vehicle lower side. Locations of the bifurcated fork of the support member 112 configure a slide guide portion 112B, and the slide guide portion 112B fits together with the slide grooves 92A of the slider 92. A guidance rod 112C is provided at an intermediate portion between the fork of the slide guide portion 112B, with its axial direction along the vehicle up-down direction, and the guidance rod 112C is inserted into a guide hole, not shown in the drawings, provided to the slider 92. The resilient member 114 is provided to the guidance rod 112C so as to be between the slider 92 and the support member 112. A coil spring, for example, is employed as the resilient member 114. The resilient member 114 imparts a urging force on the slider 92 such that an upper face of the guide portion 92C is made abutted to locations of the detent plate section 20 at the disposition position 22S and the disposition position 22L. When, in the drive position 20D, the detent pin 60 moves in the vehicle downward direction from the disposition position 22D toward the release position, the detent pin 60 presses the movable member 102, and the slider 92 is pushed down (slid in the arrow I direction) toward the vehicle lower side via the movable member 102. This pushed-down position is a position where restriction of movement of the detent pin 60 toward the second gear position 20S is released. When the slider 92 is pushed down, a space allowing movement of the detent pin 60 is formed between the guide portion 92C of the slider 92, and the disposition position 22S at the second gear position 20S. Due thereto, movement of the detent pin 60 from the drive position 20D to the respective shift positions of the second gear position 20S and the low gear position 20L is enabled.

Elongated limiter holes (restricting holes) 112D are provided to respective side face portions, which face each other, of the fork of the slide guide portion 112B. The elongated limiter holes 112D have length direction in the vehicle up-down direction, and restrict the slide range of the slider 92. Limiter projections (restricting projections) 92B provided at the vehicle lower side of the slide grooves 92A of the slider 92 are positioned inside the elongated limiter holes 112D, and the slider 92 is configured to slide along the arrow I direction, this being the vehicle up-down direction, guided by the slide guide portion 112B within the range of the elongated limiter holes 112D.

As shown in FIG. 9, a fastening hole 112A is provided to the support member 112 at a location extending toward the vehicle lower side. As shown in FIG. 8 and FIG. 10, the support member 112 is attached to the side face plate 12A through the fastening hole 112A by a fastener 106. A screw, a nut and bolt, or the like, are employed as the fastener 106.

The release section 100 is accordingly configured such that, by the movement of the detent pin 60 which is at the drive position 20D from the disposition position 22D toward the release position, the restriction by the restriction member 90 of movement of the detent pin 60 toward the second gear position 20S is mechanically released.

As shown in FIG. 8 to FIG. 10, a plate shaped support portion 116 that projects out further to the vehicle front side than the walls 90S of the restriction member 90, and that abuts a lower face of the movable member 102 so as to support the movable member 102, is integrally provided to a lower portion of the guide portion 92C of the slider 92. The support portion 116 is configured to support the movable member 102, and to distribute (disperse) load imparted to the movable member 102 due to pressing by the detent pin 60.

Similarly to the rotation arm 38 shown in FIG. 2, FIG. 3, etc., the slider 92 is provided with a shock absorber, not shown in the drawings. The shock absorber employs the same material as the shock absorber 56.

Shift Device Operation

Next, explanation follows regarding operation of the shift device 80 according to the present exemplary embodiment, with reference to FIG. 8 to FIG. 12. In the shift device 80, first, the driver performs a release operation using the operation button 18 of the shift knob, not shown in the drawings. The release operation releases fixing of the detent pin 60 in the placement position 22P at the parking position 20P, and, as shown in FIG. 10, the detent pin 60 moves in the arrow C direction to the release position.

Figure 11:
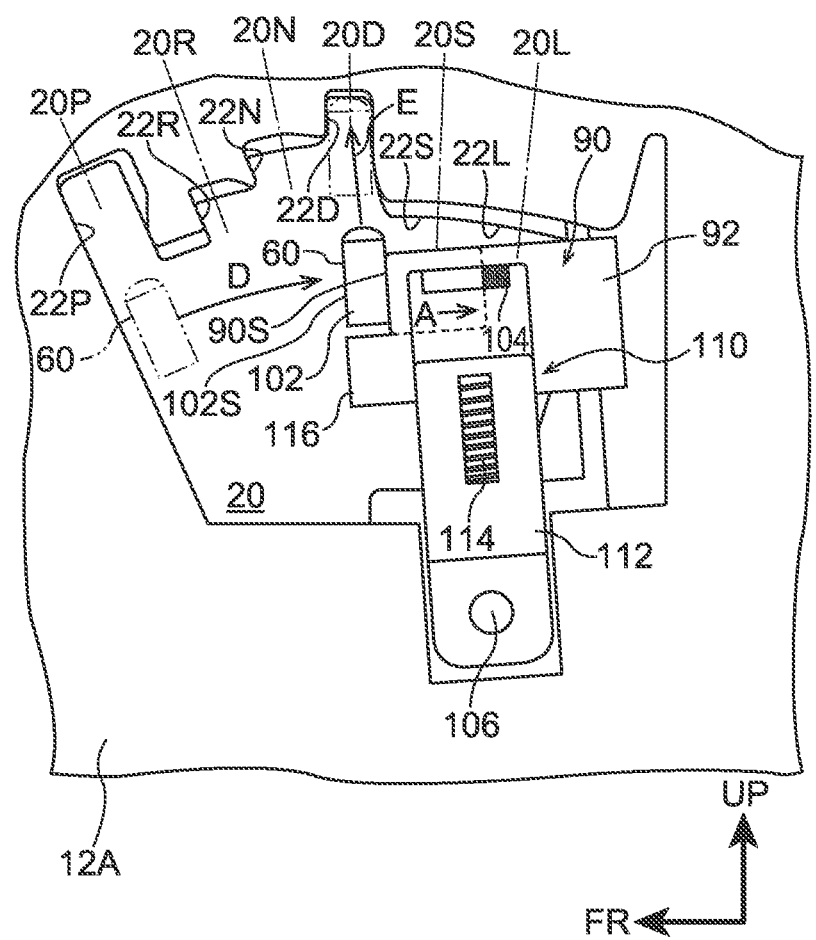
FIG. 11 is a side view corresponding to FIG. 10, showing relevant portions of a shift device to explain a second operation.

In order to select the drive mode and drive the vehicle forward, the driver moves the shift lever 16 in the arrow D direction (toward the vehicle rear side) toward the drive position 20D as shown in FIG. 11, while continuing the release operation. Due to the movement of the shift lever 16, the detent pin 60 at the release position presses the movable member 102 of the release section 100, thereby pushing and moving the movable member 102 in the arrow A direction, against the urging force of the resilient member 104 (see FIG. 9). When the movable member 102 is moved, then the detent pin 60 abuts the walls 90S of the restriction member 90 and is stopped at the drive position 20D by the walls 90S. Namely, movement of the detent pin 60 toward the respective shift positions of the second gear position 20S and the low gear position 20L is restricted. Movement of the detent pin 60 is also restricted in a similar manner when the shift lever 16 is moved from the reverse position 20R and the neutral position 20N respectively to the drive position 20D.

Figure 12:
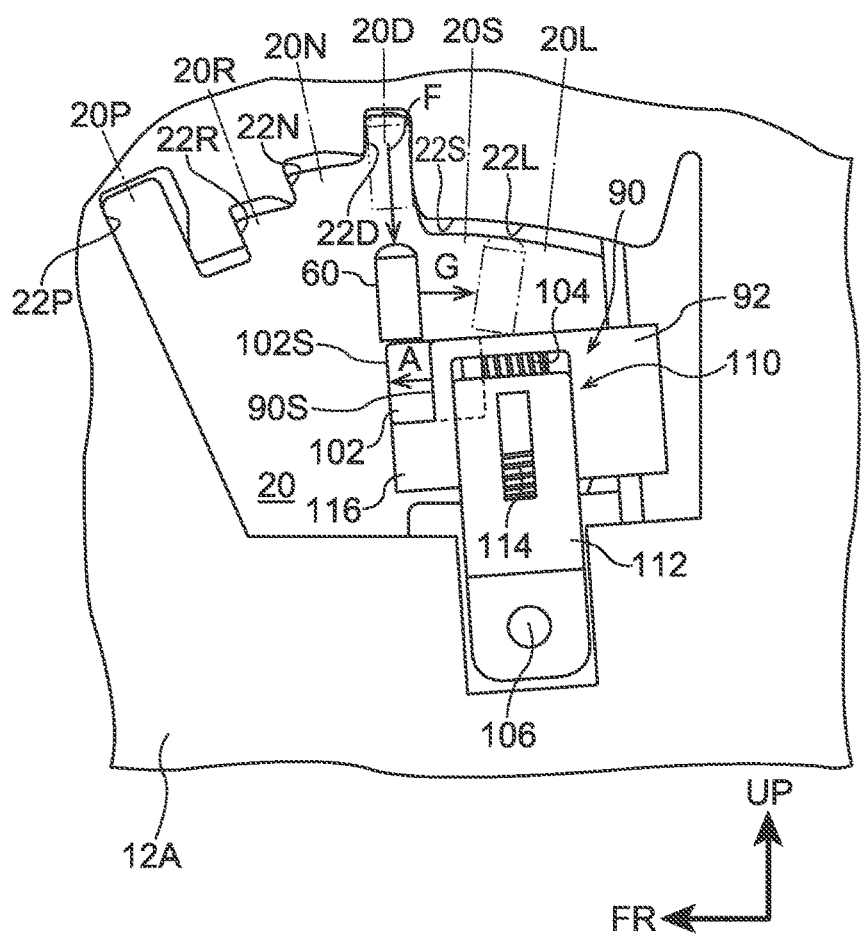
FIG. 12 is a side view corresponding to FIG. 10, showing relevant portions of a shift device to explain a third operation.

The driver ends the release operation of the operation button 18 and performs a fixing operation. As shown in FIG. 11, by the fixing operation, the detent pin 60 is moved in the arrow E direction toward the disposition position 22D at the drive position 20D, and is fixed thereat. Note that when the detent pin 60 moves in the arrow E direction from the release position toward the disposition position 22D, the pressing of the wall 102S by the detent pin 60 ends, and the movable member 102 is accordingly returned from the moved position to its original position by the urging force of the resilient member 104, as shown in FIG. 12 (movement of the movable member 102 is released).

From the drive mode, in order to select the second gear mode and change the forward drive gear ratio of the vehicle, the driver uses the operation button 18 of the shift knob to perform the release operation again. As shown in FIG. 12, by the release operation, the detent pin 60 at the disposition position 22D is moved in the arrow F direction toward the release position. Due to this movement of the detent pin 60, the detent pin 60 presses the upper face of the movable member 102, which is returned its original position, and pushes the slider 92 of the release section 100 in the vehicle downward direction via the movable member 102. Namely, the slider 92 slides along the slide guide portions 112B of the support member 112 in the arrow I direction (see FIG. 9). Pushing down the slider 92 creates a space allowing movement of the detent pin 60 in the arrow G direction between the disposition position 22S at the second gear position 20S and the disposition position 22L at the low gear position 20L, and the upper face of the slider 92. Namely, the restriction of movement to the shift positions of the second gear position 20S and the low gear position 20L is released. At the disposition position 22S at the second gear position 20S, the driver ends the release operation of the operation button 18 and performs a fixing operation. The shift lever 16 is thereby fixed in the second gear position 20S. Note that the neutral mode, the reverse mode, or the parking mode may be selected after selecting the drive mode, without selecting the second gear mode or the low gear mode.

Operation and Advantageous Effects of the Second Exemplary Embodiment

In the shift device 80 according to the present exemplary embodiment, as shown in FIG. 8 and FIG. 9, the shift lever 16 is capable of moving from the parking position 20P to the second gear position 20S, through the drive position 20D. The shift lever 16 is provided with the detent pin 60, as shown in FIG. 10. By the detent pin 60 moved at the release position, the detent pin 60 is capable of moving from the parking position 20P toward the drive position 20D.

The shift device 80 includes the restriction member 90 and the release section 100. As shown in FIG. 11, during movement of the shift lever 16 from the parking position 20P to the drive position 20D, the restriction member 90 stops the detent pin 60 that has been moved at the release position, thereby restricting movement of the shift lever 16 toward the second gear position 20S. Moreover, as shown in FIG. 12, when the shift lever 16 is at the drive position 20D (when the shift lever 16 has been moved at the drive position 20D), the release section 100 causes, by movement of the detent pin 60 from the disposition position 22D toward the release position, to release "the restriction by the restriction member 90" of movement of the shift lever 16 toward the second gear position 20S.

Therefore, when the detent pin 60 has been moved at the release position, it is possible that the shift lever 16 is stopped at the drive position 20D when moving from the parking position 20P and it is also possible that the release section 100 causes the shift lever 16 that has been moved at the drive position 20D to be moved to the second gear position 20S.

In the shift device 80 according to the present exemplary embodiment, movement of the shift lever 16 from the drive position 20D to the second gear position 20S can be restricted in operation of the shift lever 16 from the parking position 20P to the drive position 20D, even when the detent pin 60 has been moved at the release position. Namely, the shift device 80 according to the present exemplary embodiment enables skipping the drive position 20D to be restricted, similarly to the shift device 10 according to the first exemplary embodiment.

In the shift device 80 according to the present exemplary embodiment, as shown in FIG. 8 and FIG. 9, the release section 100 includes the movable member 102 and the movement section 110. As shown in FIG. 10 and FIG. 12, during movement of the shift lever 16 from the parking position 20P to the drive position 20D, the detent pin 60 that has been moved at the release position moves the movable member 102.

Moreover, as shown in FIG. 12, when the shift lever 16 has been moved at the drive position 20D (is positioned at the drive position 20D) and when the movement of the detent pin 60 to the release position is released, the movement of the movable member 102 is released. As shown in FIG. 12, when the shift lever 16 has been moved at the drive position 20D (is positioned at the drive position 20D), the movement section 110 causes, by movement of the detent pin 60 toward the release position, to move the restriction member 90 via the movable member 102, thereby releasing the restriction of movement of the shift lever 16 toward the second gear position 20S. Namely, without "moving the shift lever 16 from the parking position 20P to the drive position 20D, then releasing the detent pin 60 from the release position, and thereafter moving the detent pin 60 back to the release position again", the release section 100 cannot perform that the restriction member 90 is moved to release the restriction of movement of the shift lever 16 toward the second gear position 20S.

In the shift device 80 according to the present exemplary embodiment, as shown in FIG. 9 and FIG. 11, the movable member 102 is movable with respect to the restriction member 90 in the movement direction of the detent pin 60 accompanying movement of the shift lever 16 from the parking position 20P to the drive position 20D (the vehicle rear direction or the arrow A direction). Since the detent pin 60 that has been moved at the release position moves the movable member 102 and is stopped by the restriction member 90, movement of the shift lever 16 toward the second gear position 20S is restricted during movement of the shift lever 16 from the parking position 20P to the drive position 20D. As shown in FIG. 12, movement of the movable member 102 with respect to the restriction member 90 in the movement direction of the detent pin 60 toward the release position (vehicle downward direction) is restricted. Accordingly, by the movement of the detent pin 60 toward the release position, the restriction member 90 is moved via the movable member 102 that is movement-restricted in this movement direction with respect to the restriction member 90, thereby releasing the restriction of movement of the shift lever 16 toward the second gear position 20S.

As shown in FIG. 9 and FIG. 12, in the shift device 80 according to the present exemplary embodiment, the movement section 110 is configured so as to slide the slider 92. More specifically, the movement section 110 includes the slide grooves 92A provided to the slider 92, the support member 112 that fits together with the slide grooves 92A and that slides and moves the slider 92, and the resilient member 114. There are few components, due to forming the movement section 110 from three main configuration elements, enabling a simple configuration for the movement section 110.

As shown in FIG. 8 and FIG. 9, in the shift device 80 according to the present exemplary embodiment, the sliding mechanical unit that restricts skipping is configured from a total of five components, namely the restriction member 90, the movable member 102, the movement section 110, and the two elements of the resilient member 104 and the resilient member 114. The number of components is accordingly small, enabling a simple configuration for the sliding mechanical unit.

As shown in FIG. 9, in the shift device 80 according to the present exemplary embodiment, the movable member 102 of the release section 100 is configured with slide movement. More specifically, the movable member 102 is configured from the three main configuration elements of the guide hole 102B provided to the movable member 102, the guidance rod 92E integrally provided to the guide portion 92C, and the resilient member 104. This thereby enables a simple configuration for the release section 100.

As shown in FIG. 9, in the shift device 80 according to the present exemplary embodiment, the restriction member 90 is provided with the support portion 116 that supports the movable member 102. The support portion 116 receives load due to the movement of the detent pin 60 from the disposition position 22D at the drive position 20D toward the release position via the movable member 102. Load imparted to the movable member 102 is accordingly distributed (dispersed) to the support portion 116, enabling an increase in durability of the restriction member 90. Note that the support portion 116 is also employed to restrict movement of the movable member 102 with respect to the restriction member 90 in the movement direction of the detent pin 60 toward the release position.

Similarly to the shift device 10 according to the first exemplary embodiment, although not shown in the drawings, the shift device 80 according to the present exemplary embodiment is provided with the shock absorber at the upper face of the restriction member 90. The shock absorber is formed of the same material as the shock absorber 56 described above. Sound generation when the restriction member 90 abuts the inner face of the detent plate section 20 can accordingly be suppressed. Note that the shock absorber may be provided on the detent plate section 20 side.

Modified Example

Figure 13:
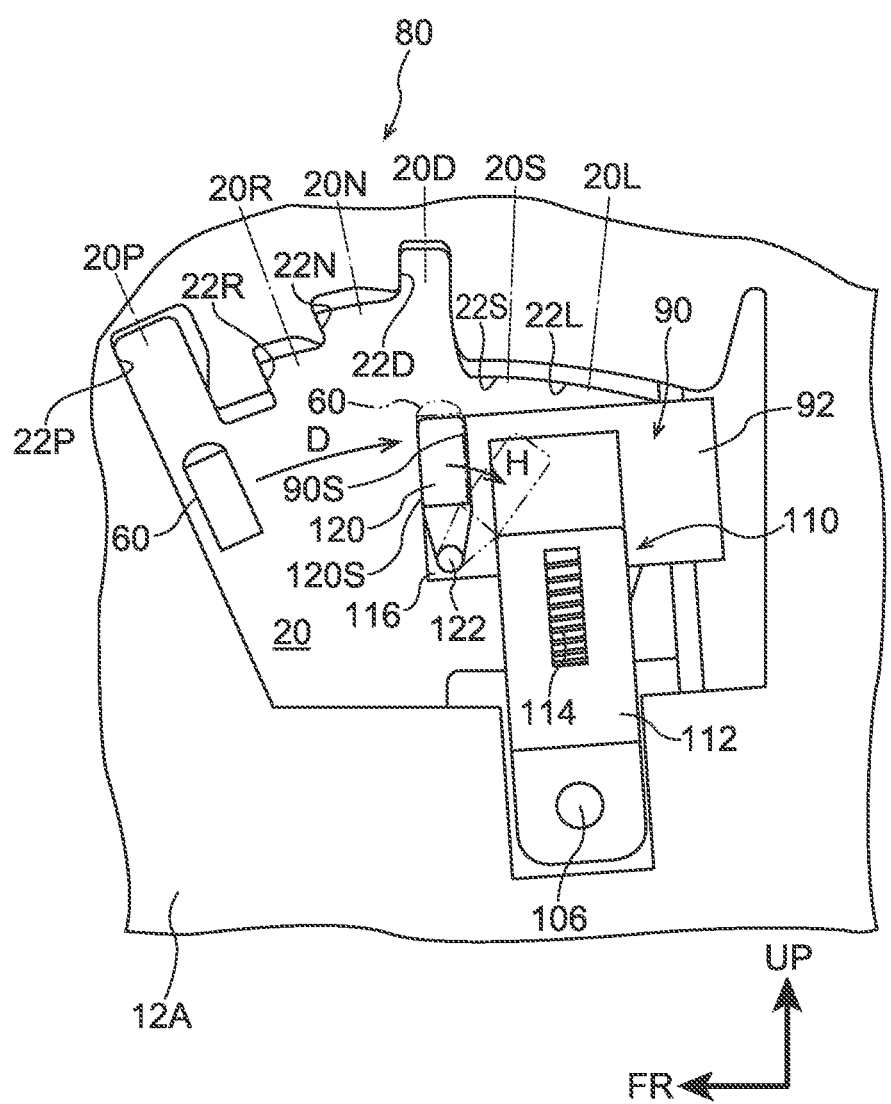
FIG. 13 is a side view corresponding to FIG. 10, showing relevant portions of a shift device of a modified example of the second exemplary embodiment.

Explanation follows regarding a shift device 80 according to a modified example of the second exemplary embodiment, with reference to FIG. 13. As shown in FIG. 13, similarly to the shift device 10 shown in FIG. 7, described above, the shift device 80 according to the modified example includes a movable member 120 in place of the movable member 102 of the release section 100 described above. A vehicle front side face of the movable member 120 configures a wall 120S that is abutted by the detent pin 60, and the movable member 120 turns (moves) in the arrow H direction about a rotation shaft 122 provided to the support portion 116. The movable member 120 that has moved (rotated) in the arrow H direction is returned to the drive position 20D by a resilient member, not shown in the drawings. Rotational movement of the movable member 70 is different from slide movement, but the movable member 120 exhibits similar operation to the movable member 102 described above.

The shift device 80 according to the modified example enables similar operation and advantageous effects to the operation and advantageous effects obtained by the shift device 80 according to the second exemplary embodiment.

Third Exemplary Embodiment

Next, explanation follows regarding a shift device 130 according to a third exemplary embodiment, with reference to FIG. 14 to FIG. 20.

Overall Configuration of Shift Device

Figure 14:
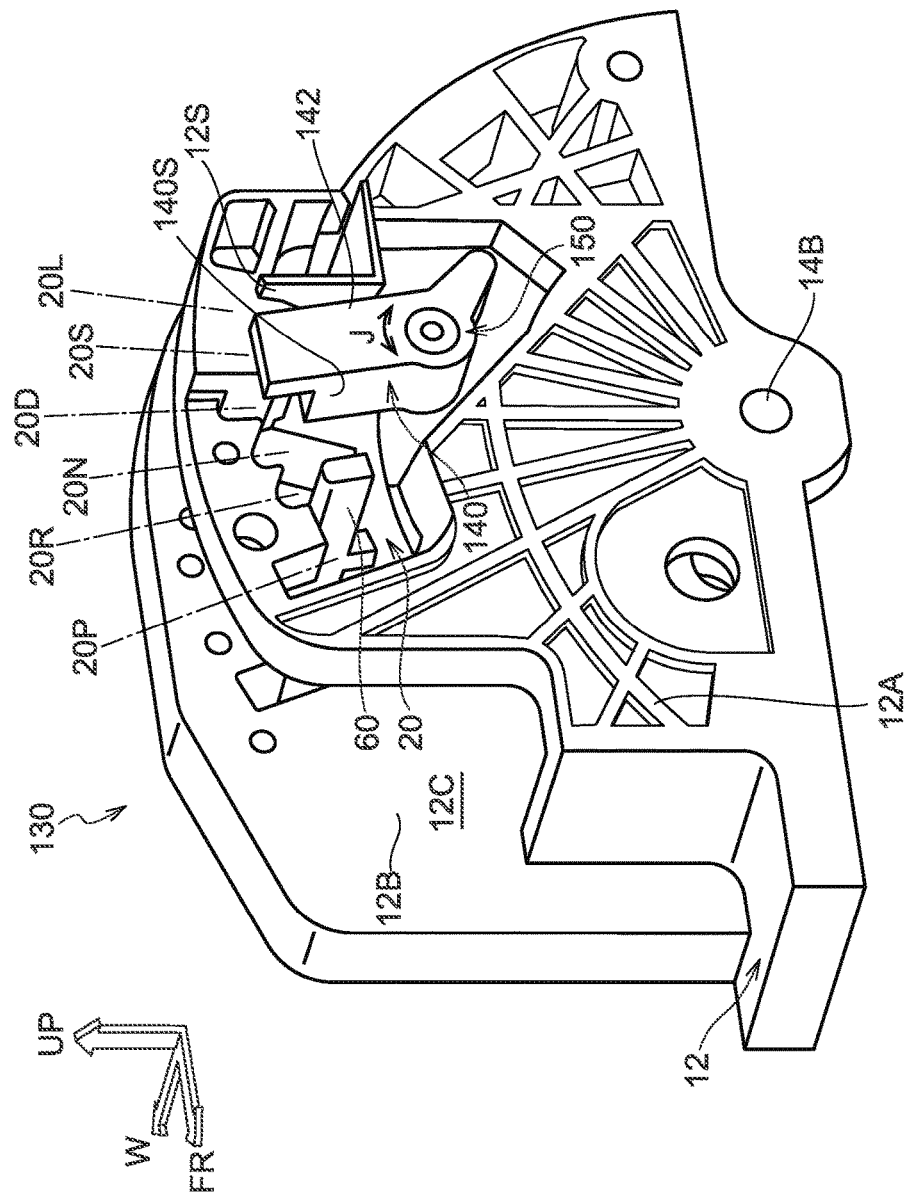
FIG. 14 is a perspective view corresponding to FIG. 1, showing a shift device according to a third exemplary embodiment.

The shift device 130 according to the present exemplary embodiment shown in FIG. 14 has substantially the same configuration as the configuration of the shift device 10 according to the first exemplary embodiment shown in FIG. 1 and FIG. 2, with the exception of the restriction member 30 and the release section 40. The shift device 130 according to the present exemplary embodiment is provided with a restriction member 140 and a release section 150 in place of the restriction member 30 and the release section 40. The restriction member 140 and the release section 150 configure a rotating mechanical unit that restricts movement of the shift lever 16 from the drive position 20D to the second gear position 20S during operation of the shift lever 16 from the parking position 20P to the drive position 20D, even when the detent pin 60 has been moved at the release position. Namely, in the present exemplary embodiment, the restriction member 140 and the release section 150 are configured to restrict the shift lever 16 from skipping the drive position 20D.

Restriction Member and Release Mechanism Configuration

As shown in FIG. 14, FIG. 15, FIG. 16A, FIG. 16B, and FIG. 17, the restriction member 140 is formed by a rotation arm 142. The rotation arm 142 includes a wall 140S that respectively can align in the substantially vehicle up-down direction with inner wall faces on the vehicle front side and vehicle rear side of the disposition position 22D. More specifically, the rotation arm 142 is formed from a substantially rectangular parallelopiped block shaped resin plate member with its length direction in the substantially vehicle up-down direction, and with its thickness direction in the vehicle width direction. A face (front face) running along a long side of the rotation arm 142 on the vehicle front side of the rotation arm 142 configures the wall 140S. The rotation arm 142 is movable (rotatable) along the arrow J direction, this being the substantially vehicle front-rear direction, and the wall 140S aligns with the vehicle rear side inner wall face of the disposition position 22D (a stopping position) in the substantially vehicle up-down direction (in the axial direction of the shift lever 16 at the drive position 20D) when the restriction member 140 has been moved toward the vehicle rear side. The wall 140S aligns with the vehicle front side inner wall face of the disposition position 22D in the substantially vehicle up-down direction when this movement of the restriction member 140 toward the vehicle rear side has been released (a movement start position). The wall 140S is integrally formed using a portion of the rotation arm 142, or being integrally to the rotation arm 142. The wall 140S stops the detent pin 60 that is in a release position, this being a state in which by the release operation of the operation button 18 (see FIG. 1), movement from the parking position 20P to the drive position 20D is enabled, at the drive position 20D, thereby restricting movement toward the second gear position 20S.

Figure 16A:
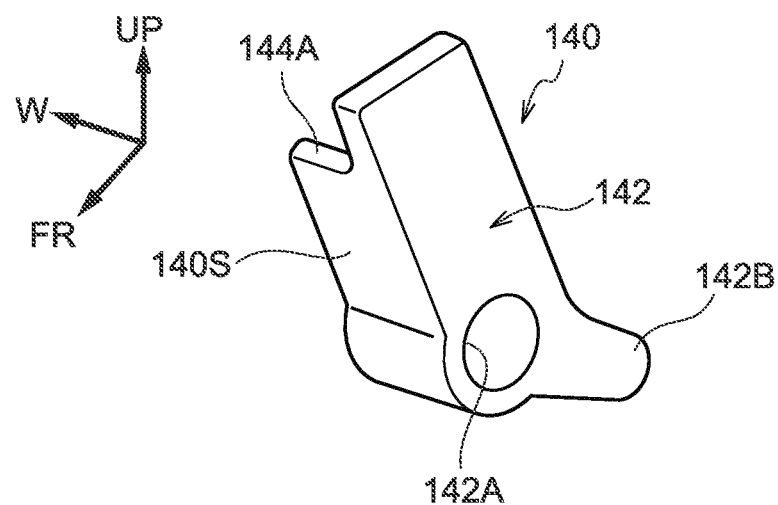
FIG. 16A is a perspective view showing a restriction member of the shift device shown in FIG. 14 and FIG. 15.
Figure 16B:
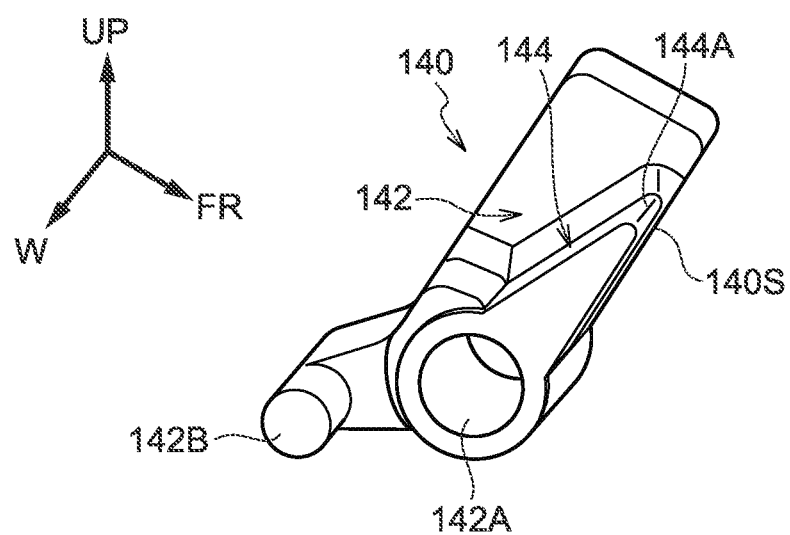
FIG. 16B is a perspective view showing the restriction member shown in FIG. 16A, as viewed from the opposite side in the vehicle width direction.
Figure 17:
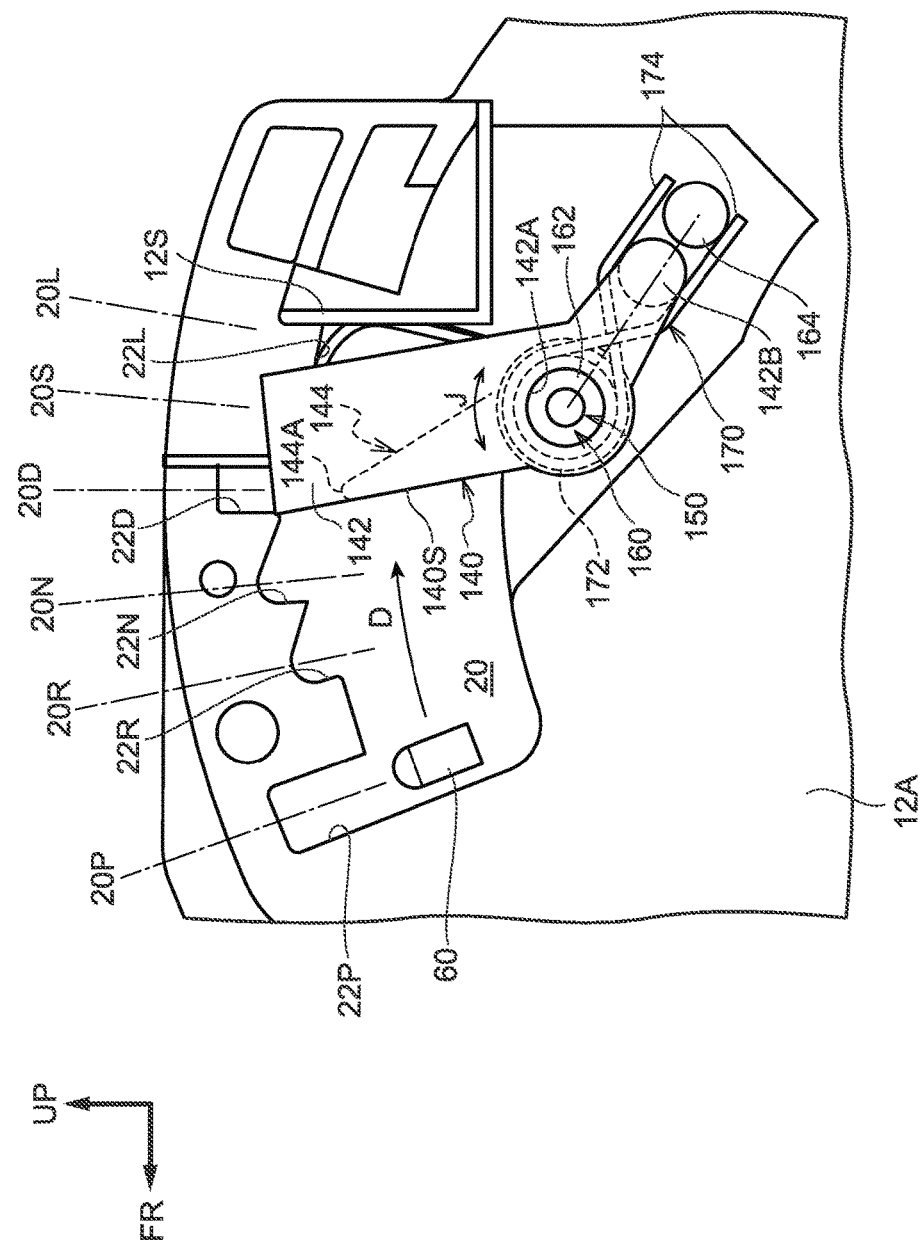
FIG. 17 is a side view viewed along a vehicle side face direction, showing relevant portions of the shift device shown in FIG. 14 and FIG. 15 to explain a first operation.

As shown in FIG. 16B and FIG. 17, a pressed portion 144 is provided at the rotation arm 142 of the restriction member 140. More specifically, the pressed portion 144 is provided at further to the second gear position 20S side than the wall 140S. The pressed portion 144 is provided at a back face location approximately corresponding to a vehicle width direction inside half of the wall 140S. An upper end portion 144A of the pressed portion 144 is positioned at the vehicle front side, and is contiguous with (connected to) a vehicle up-down direction intermediate portion of the wall 140S. The pressed portion 144 extends from the upper end portion 144A in a diagonal direction toward the vehicle rear side and the vehicle lower side as viewed from the side of the vehicle. Namely, the pressed portion 144 configures an inclined face. The inclined face may be a flat face, or may be a curved face. The pressed portion 144 is configured that the restriction member 140 is moved toward the vehicle front side, from the movement start position to a movement restriction release position by the pressed portion 144 due to the detent pin 60 moving from the disposition position 22D (non-release position side) to the release position at the drive position 20D.

As shown in FIG. 15, FIG. 16A, FIG. 16B, and FIG. 17, the release section 150 includes a movement section (movement mechanism) 160 and a resilient member 170. The movement section 160 includes a rotation shaft hole 142A provided at a vehicle up-down direction intermediate portion of the rotation arm 142, penetrating in the vehicle width direction, and a rotation shaft 162 that fits through into the rotation shaft hole 142A. The rotation shaft 162 is integrally formed at a portion of the side face plate 12A, which portion is at the vehicle rear side and is further to the vehicle lower side than the detent plate section 20. The rotation shaft 162 is formed projecting out from the side face plate 12A with its axial direction in the vehicle width direction. One end portion on the vehicle upper side of the rotation arm 142 accordingly turns about the rotation shaft 162 in the arrow J direction.

Figure 15:
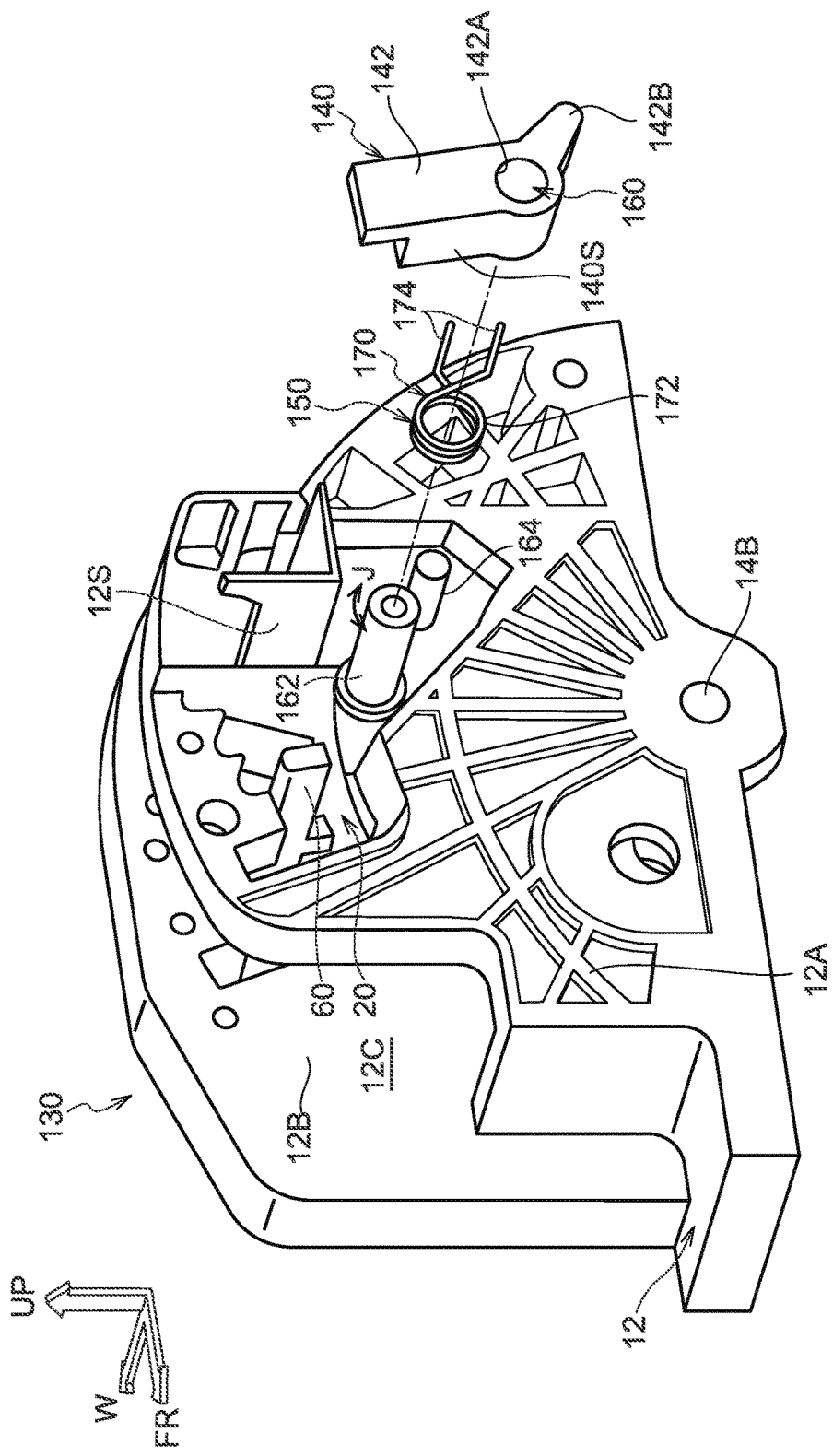
FIG. 15 is an exploded perspective view of the shift device shown in FIG. 14.

As shown in FIG. 14, FIG. 15, and FIG. 17, the movement section 160 includes a limiting portion (restricting portion) 12S that restricts the restriction member 140 at the stopping position, a retaining portion 164 that retains the restriction member 140 at the movement start position, and a release portion 142B that releases the movement of the restriction member 140 toward the stopping position and the movement of the restriction member 140 toward the movement restriction position. Note that the movement start position of the restriction member 140 is a position where the inner wall face on the vehicle front side of the disposition position 22D and the wall 140S of the restriction member 140 are aligned with each other in the substantially vehicle up-down direction so that the disposition position 22D is closed (blocked) by the restriction member 140. The movement start position is the start position of movement of the restriction member 140 toward the stopping position due to movement of the detent pin 60 that is at the release position toward the vehicle rear side, and is also the start position of movement of the restriction member 140 toward the movement restriction release position due to movement of the detent pin 60 toward the vehicle lower side, from the disposition position 22D to the release position. The stopping position is a position where the restriction member 140 has moved toward the vehicle rear side, such that the wall 140S of the restriction member 140 is aligned with the inner wall face on the vehicle rear side of the disposition position 22D in substantially vehicle up-down direction so as to open the disposition position 22D such that the detent pin 60 is capable of moving from the release position to the disposition position 22D, and can be fixed at the drive position 20D. The movement restriction release position of the restriction member 140 is a position where the restriction member 140 has moved (rotated) toward the vehicle lower side, due to movement of the detent pin 60 from the disposition position 22D toward the release position, thereby releasing restriction by the restriction member 140 of movement of the shift lever 16 toward the second gear position 20S.

The limiting portion 12S is integrally formed to the side face plate 12A at a portion further to the vehicle rear side of the side face plate 12A than the detent plate section 20, and is formed projecting out from the side face plate 12A toward the vehicle width direction outside. The limiting portion 12S is provided with a wall capable of receiving a rear side face on the vehicle rear side of the rotation arm 142 and restricting movement of the rotation arm 142 when the restriction member 140 has moved at the stopping position. In the present exemplary embodiment, the limiting portion 12S is configured including an upright wall portion (reference numeral omitted) serving as the wall extending along the vehicle up-down direction and the vehicle width direction, and a lateral wall portion (reference numeral omitted) that extends from a vehicle lower end of the upright wall portion toward the vehicle rear side, and that is integrally formed to the upright wall portion.

The retaining portion 164 is integrally formed to the side face plate 12A at a portion further to the vehicle lower side than the limiting portion 12S, this being further to the vehicle rear side and to the vehicle lower side than the rotation shaft 162 of the movement section 160. The retaining portion 164 is formed projecting out from the side face plate 12A toward the vehicle width direction outside. The shape of the retaining portion 164 is not particularly limited; in the present exemplary embodiment, the retaining portion 164 has a circular column shape with axial direction in the vehicle width direction. The release portion 142B is integrally formed to the rotation arm 142 at another end portion which is at the vehicle lower side of the rotation arm 142, and is formed projecting out from the rotation arm 142 toward the vehicle width direction inside, toward the side face plate 12A. Similarly to the retaining portion 164, the shape of the release portion 142B is not particularly limited; in the present exemplary embodiment, the release portion 142B has a circular column shape with axial direction in the vehicle width direction. A diameter dimension of the release portion 142B and a diameter dimension of the retaining portion 164 are set at substantially the same as each other. The release portion 142B is positioned between the rotation shaft 162 and the retaining portion 164 as viewed from the side of the vehicle. The another end portion of the rotation arm 142 is accordingly formed in a shape bent slightly toward the vehicle rear side from an intermediate portion (a portion at the rotation shaft hole 142A), and the rotation arm 142 is formed in a substantially L-shape as viewed from the side of the vehicle.

Figure 18:
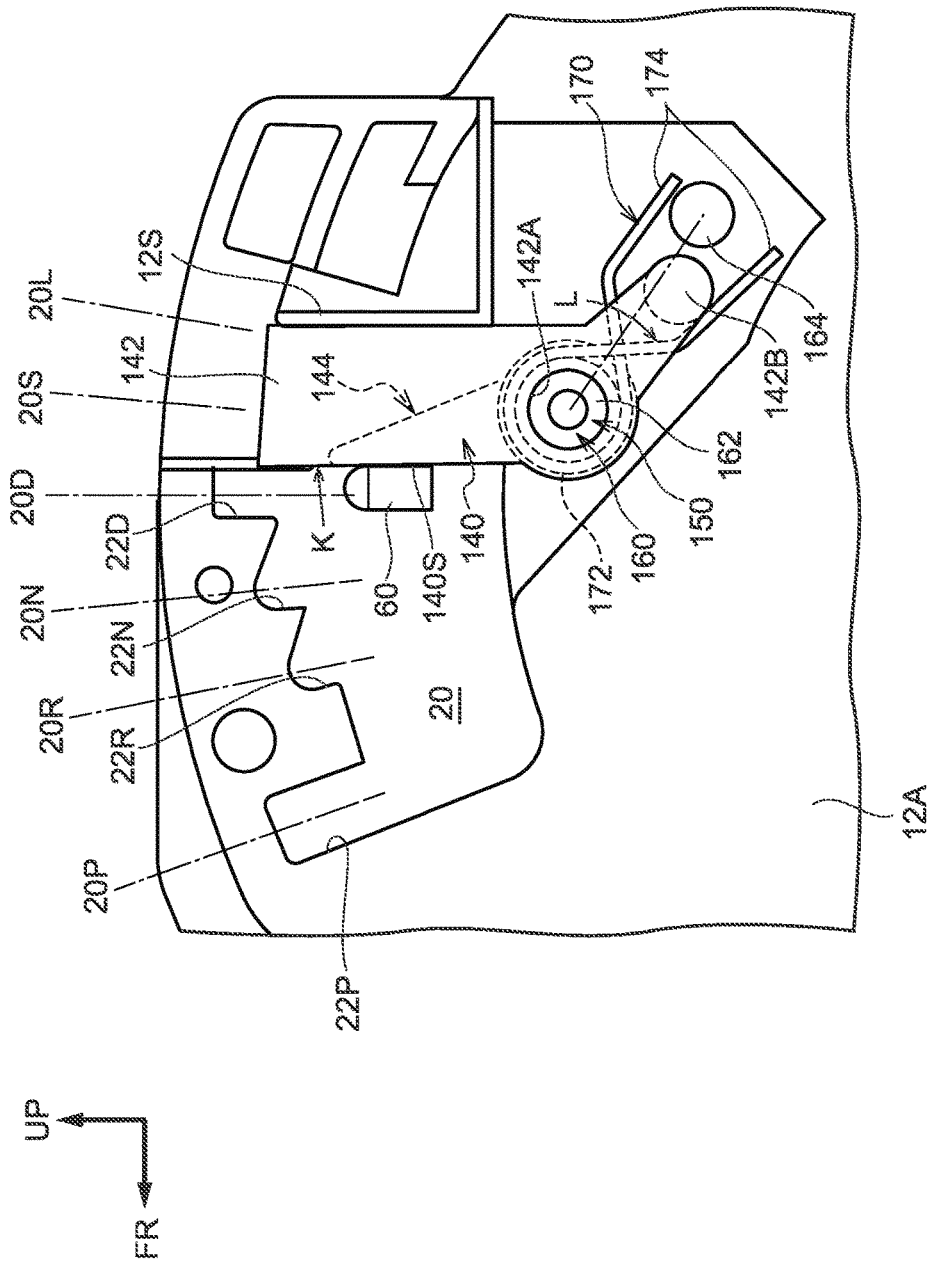
FIG. 18 is a side view corresponding to FIG. 17, showing relevant portions of a shift device to explain a second operation.

As shown in FIG. 15 and FIG. 17, the resilient member 170 spans between the retaining portion 164 and the release portion 142B of the movement section 160. In the present exemplary embodiment, a torsion coil spring (kick spring) is employed as the resilient member 170. The resilient member 170 includes a coil portion 172, and both end portions 174 that cross over each other once extending from the coil portion 172. The rotation shaft 162 is inserted through the inside of the coil portion 172, and the release portion 142B and the retaining portion 164 are fitted together with both end portions 174 in sandwich manner, thereby assembling the resilient member 170 to the movement section 160. As shown in FIG. 17, in a state in which the shift lever 16 (see FIG. 1) has not been moved to the drive position 20D, the release portion 142B is positioned on a straight line joining the center of the rotation shaft 162 of the movement section 160 to the center of the retaining portion 164 of the movement section 160, such that the resilient member 170 retains the restriction member 140 in the movement start position. As shown in FIG. 18, when, for example, the shift lever 16 is moved from the parking position 20P to the drive position 20D, the detent pin 60 that has been moved at the release position presses the wall 140S in the arrow K direction, this being toward the vehicle rear side, against the urging force of the resilient member 170. The restriction member 140 accordingly moves from the movement start position toward the stopping position, and the detent pin 60 is stopped by the wall 140S at the stopping position. The release portion 142B accordingly moves in the arrow L direction, away from the straight line joining the rotation shaft 162 and the retaining portion 164 toward the vehicle lower side, and both end portions 174 of the resilient member 170 are spread apart by the retaining portion 164 and the release portion 142B. At this state, the resilient member 170 accordingly generates urging force to return the restriction member 140 to the movement start position.

Shift Device Operation

Next, explanation follows regarding operation of the shift device 130 according to the present exemplary embodiment, with reference to FIG. 17 to FIG. 20. In the shift device 130, first, the driver performs a release operation using the operation button 18 (see FIG. 1) of the shift knob, not shown in the drawings. The release operation releases fixing of the detent pin 60 in the placement position 22P at the parking position 20P, and, as shown in FIG. 17, the detent pin 60 moves toward the release position (see FIG. 3 and FIG. 10).

In order to select the drive mode and drive the vehicle forward, the driver moves the shift lever 16 in the arrow D direction toward the drive position 20D as shown in FIG. 17, while continuing the release operation. Due to this movement of the shift lever 16, the detent pin 60 that is in the release position abuts the wall 140S of the restriction member 140 that is in the movement start position, and then as shown in FIG. 18, the detent pin 60 presses the restriction member 140 in the arrow K direction against the urging force of the resilient member 170 of the release section 150, thereby moving the restriction member 140 toward the vehicle rear side. The restriction member 140 moves (rotates) about the rotation shaft 162 in the arrow K direction due to the movement section 160 of the release section 150. The movement of the restriction member 140 is stopped when the restriction member 140 has moved as far as the stopping position where movement is restricted by the limiting portion 12S. The detent pin 60 is accordingly stopped at the drive position 20D. Namely, movement of the detent pin 60 toward the respective shift positions of the second gear position 20S and the low gear position 20L is restricted. Movement of the detent pin 60 is also restricted in a similar manner when the shift lever 16 is moved from the reverse position 20R and the neutral position 20N respectively.

Figure 19:
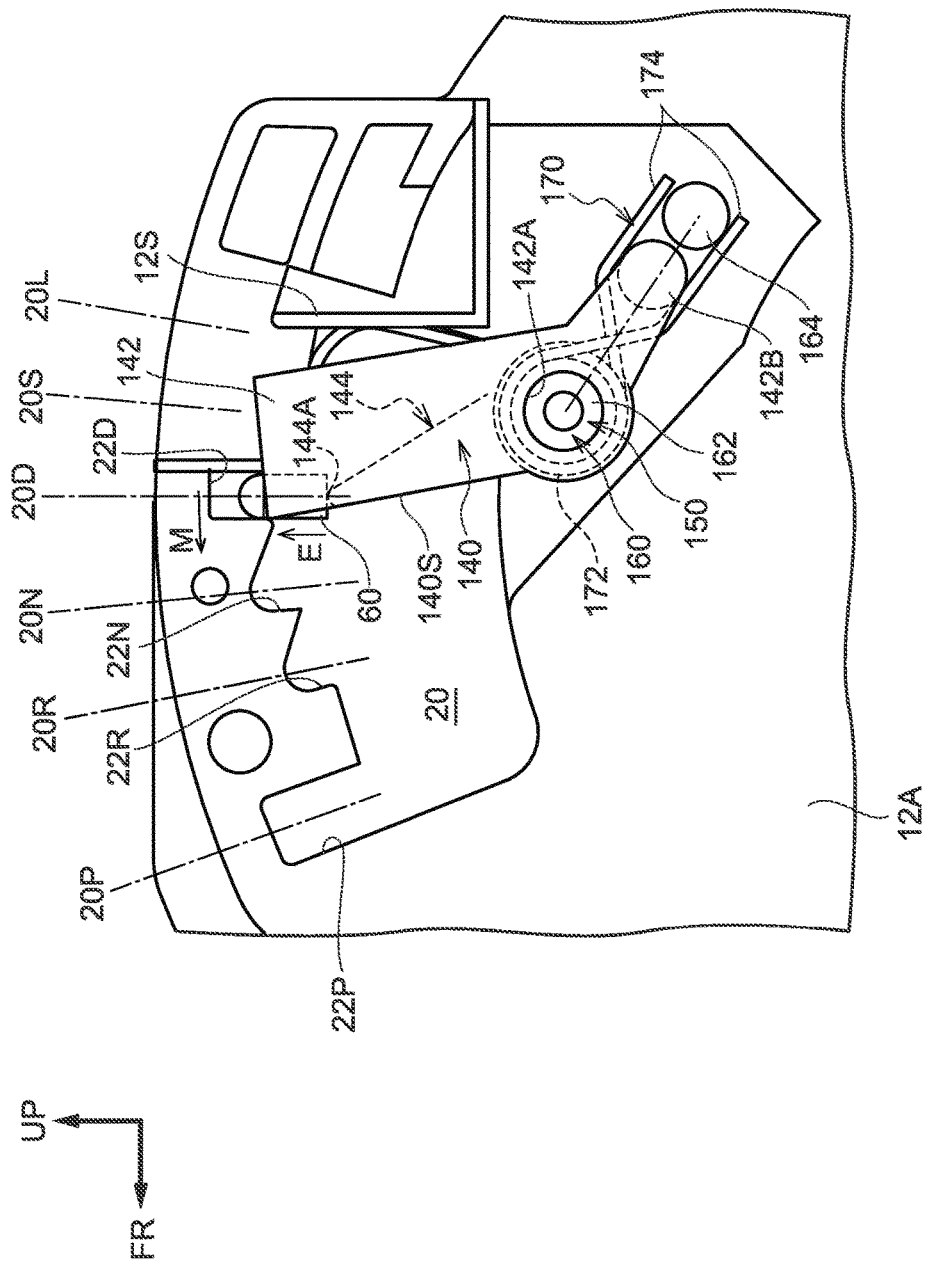
FIG. 19 is a side view corresponding to FIG. 17, showing relevant portions of a shift device to explain a third operation.

The driver ends the release operation of the operation button 18 and performs a fixing operation. As shown in FIG. 19, by the fixing operation, the detent pin 60 is moved in the arrow E direction toward the disposition position 22D at the drive position 20D, and is fixed. Note that when the detent pin 60 moves in the arrow E direction from the release position toward the disposition position 22D, the pressing of the wall 140S by the detent pin 60 ends at the exact moment when the detent pin 60 passes over the upper end portion 144A of the pressed portion 144 of the restriction member 140. The restriction member 140 is accordingly returned in the arrow M direction, from the stopping position to its original movement start position, by the urging force of the resilient member 170 (the movement to the stopping position is released).

Figure 20:
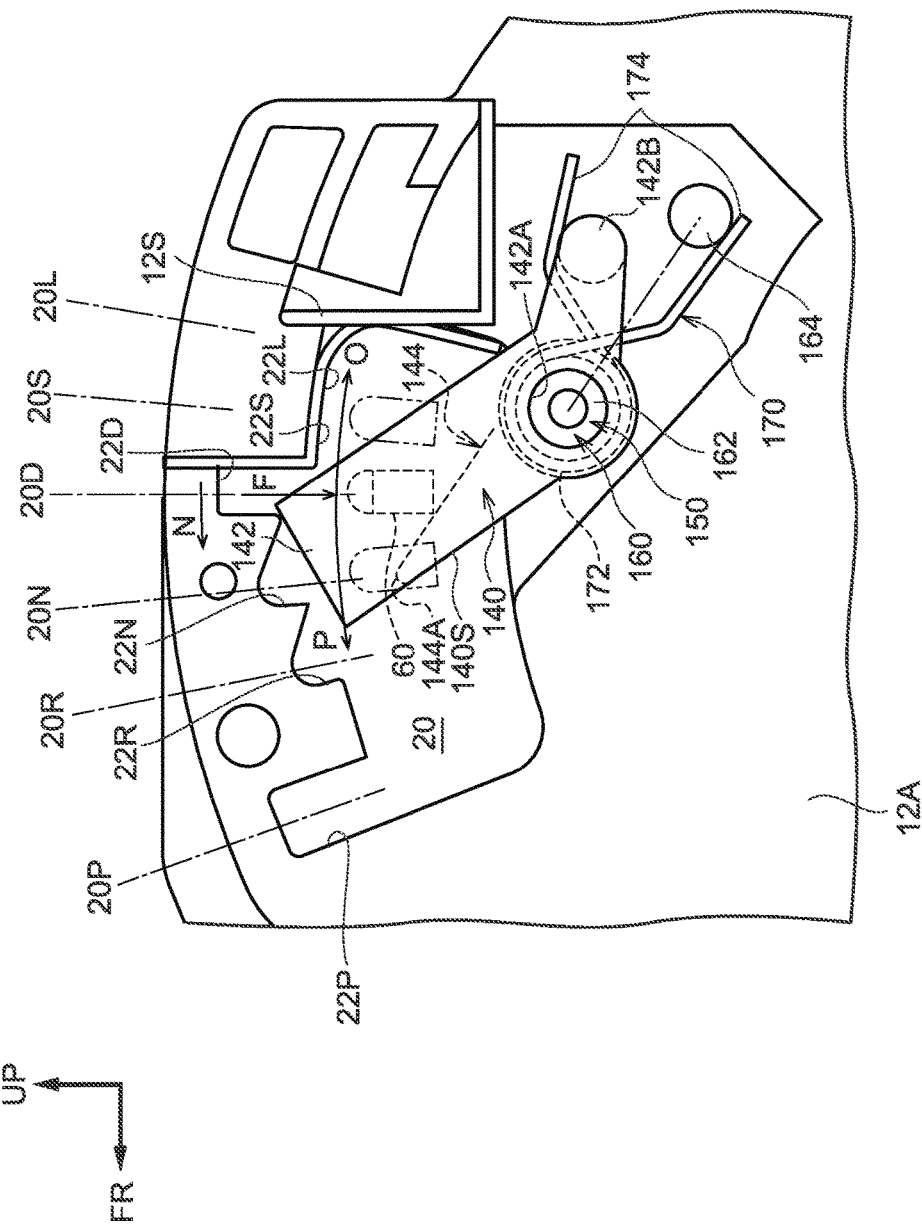
FIG. 20 is a side view corresponding to FIG. 17, showing relevant portions of a shift device to explain a fourth operation.

From the drive mode, in order to select the second gear mode and change the forward drive gear ratio of the vehicle, the driver uses the operation button 18 of the shift knob to perform the release operation again. As shown in FIG. 20, by this release operation, the detent pin 60 at the disposition position 22D is moved in the arrow F direction toward the release position. Due to this movement of the detent pin 60, the detent pin 60 presses the pressed portion 144 of the restriction member 140 toward the vehicle downward direction, and the restriction member 140 and the wall 140S move (rotates) toward the vehicle lower side. When the detent pin 60 moves as far as its release position, the restriction member 140 moves as far as its movement restriction release position, creating a space allowing movement of the detent pin 60 in the arrow O direction between the disposition position 22S at the second gear position 20S and the disposition position 22L at the low gear position 20L, and the pressed portion 144. Namely, the restriction by the restriction member 140 of movement toward the shift positions of the second gear position 20S and the low gear position 20L is released. At the disposition position 22S at the second gear position 20S, the driver ends the release operation of the operation button 18 and performs a fixing operation. The shift lever 16 is thereby fixed in the second gear position 20S. Note that the shift lever 16 can be moved in the arrow P direction to select the neutral mode, the reverse mode, or the parking mode after selecting the drive mode, without selecting the second gear mode or the low gear mode.

Operation and Advantageous Effects of the Third Exemplary Embodiment

As shown in FIG. 14, FIG. 15, and FIG. 17, in the shift device 130 according to the present exemplary embodiment, the shift lever 16 (see FIG. 1) is capable of moving from the parking position 20P to the second gear position 20S, through the drive position 20D. The shift lever 16 is provided with the detent pin 60. By moved at the release position, the detent pin 60 is capable of moving from the parking position 20P toward the drive position 20D.

The shift device 130 includes the restriction member 140 and the release section 150. During movement of the shift lever 16 (see FIG. 1) from the parking position 20P to the drive position 20D, the detent pin 60 that has been moved at the release position moves the restriction member 140 to the stopping position, thereby stopping the detent pin 60 that has been moved at the release position, and restricting movement of the shift lever 16 toward the second gear position 20S. When the shift lever 16 has been moved at the drive position 20D (the shift lever 16 is positioned at the drive position 20D), the release section 150 causes, by movement of the detent pin 60 from the disposition position 22D toward the release position thereby moving the restriction member 140 to its movement restriction release position, to release "the restriction by the restriction member 140" of movement of the shift lever 16 toward the second gear position 20S. This thereby enables the restriction member 140 to stop the shift lever 16 at the drive position 20D when moving from the parking position 20P, even when the detent pin 60 has been moved at the release position, and this also enables the release section 150 to allow the shift lever 16 that has been moved at the drive position 20D to move toward the second gear position 20S.

In the shift device 130 according to the present exemplary embodiment, during operation of the shift lever 16 from the parking position 20P to the drive position 20D, movement of the shift lever 16 from the drive position 20D to the second gear position 20S can be restricted even when the detent pin 60 has been moved at the release position. Namely, the shift device 130 according to the present exemplary embodiment enables skipping the drive position 20D to be restricted.

In the shift device 130 of the present exemplary embodiment, the release section 150 is provided with at least the resilient member 170. During movement of the shift lever 16 from the parking position 20P to the drive position 20D, the detent pin 60 that has been moved at the release position moves the restriction member 140 from the movement start position as far as the stopping position where is stopped against the urging force of the resilient member 170. When the shift lever 16 has been moved at the drive position 20D (is positioned at the drive position 20D), the resilient member 170 releases the movement of the restriction member 140 to the stopping position when the movement of the detent pin 60 to the release position is released. When the shift lever 16 has been moved at the drive position 20D (is positioned at the drive position 20D), against the urging force of the resilient member 170, the detent pin 60 move the restriction member 140 from the movement start position to the movement restriction release position due to the movement of the detent pin 60 from the disposition position 22D (the non-release position) toward the release position, thereby releasing the restriction by the restriction member 140 of movement of the shift lever 16 toward the second gear position 20S.

Namely, without "moving the shift lever 16 from the parking position 20P to the drive position 20D, then releasing the detent pin 60 from the release position, and thereafter moving the detent pin 60 back to the release position again", the release section 150 cannot perform that the restriction member 140 is moved to release the restriction of movement of the shift lever 16 toward the second gear position 20S. As mentioned above, the resilient member 170 imparts the urging force on the restriction member 140 such that the restriction member 140 is moved to return to the movement start position side due to the urging force when the restriction member 140 is moved from the movement start position to the stopping position and when the restriction member 140 is moved from the movement start position to the movement restriction release position.

Moreover, in the shift device 130 according to the present exemplary embodiment, the restriction member 140 and the release section 150 are configured so as to operate mechanically accompanying movement of the detent pin 60. Namely, a configuration electrically or mechanically coupled to operation of a brake pedal is not required.

The shift device 130 according to the present exemplary embodiment does not require the movable member 42 of the release section 40 of the shift device 10 according to the first exemplary embodiment shown in FIG. 2, or components related thereto. Similarly, the shift device 130 according to the present exemplary embodiment does not require the movable member 70, etc. of the shift device 10 according to the modified example shown in FIG. 7, the movable member 102, etc. of the shift device 80 according to the second exemplary embodiment shown in FIG. 9, or the movable member 120, etc. of the shift device 80 according to the modified example shown in FIG. 13. More specifically, the release section 150 of the shift device 130 includes the resilient member 170 as the main configuration, and the restriction member 140 (rotation arm 142) is configured so as to be moved to the stopping position and the movement restriction release position, and release these movements, by itself. Components corresponding to the movable member 42, etc. can accordingly be omitted, thereby enabling the release section 150 to be configured simply, with few components.

Moreover, as shown in FIG. 15, FIG. 16A, and FIG. 16B, in the release section 150, the movement section 160 is mainly configured from the rotation shaft hole 142A and the release portion 142B that are provided to the restriction member 140, and the rotation shaft 162, the limiting portion 12S, and the retaining portion 164 that are integrally formed to the side face plate 12A. The resilient member 170 that is the main configuration element of the release section 150 is configured by a simple torsion coil spring. There are accordingly few components, and most of these components can be manufactured by resin injection molding, thereby enabling a simple configuration for the release section 150.

As shown in FIG. 14 and FIG. 15, in the shift device 130 according to the present exemplary embodiment, the rotating mechanical unit for restricting skipping is configured from a total of two configuration elements, namely the restriction member 140 and the release section 150. There are accordingly few components, enabling a simple configuration for the rotating mechanical unit.

Fourth Exemplary Embodiment

Next, explanation follows regarding a shift device 180 according to a fourth exemplary embodiment, with reference to FIG. 21 to FIG. 25.

Overall Configuration of Shift Device

Figure 21:
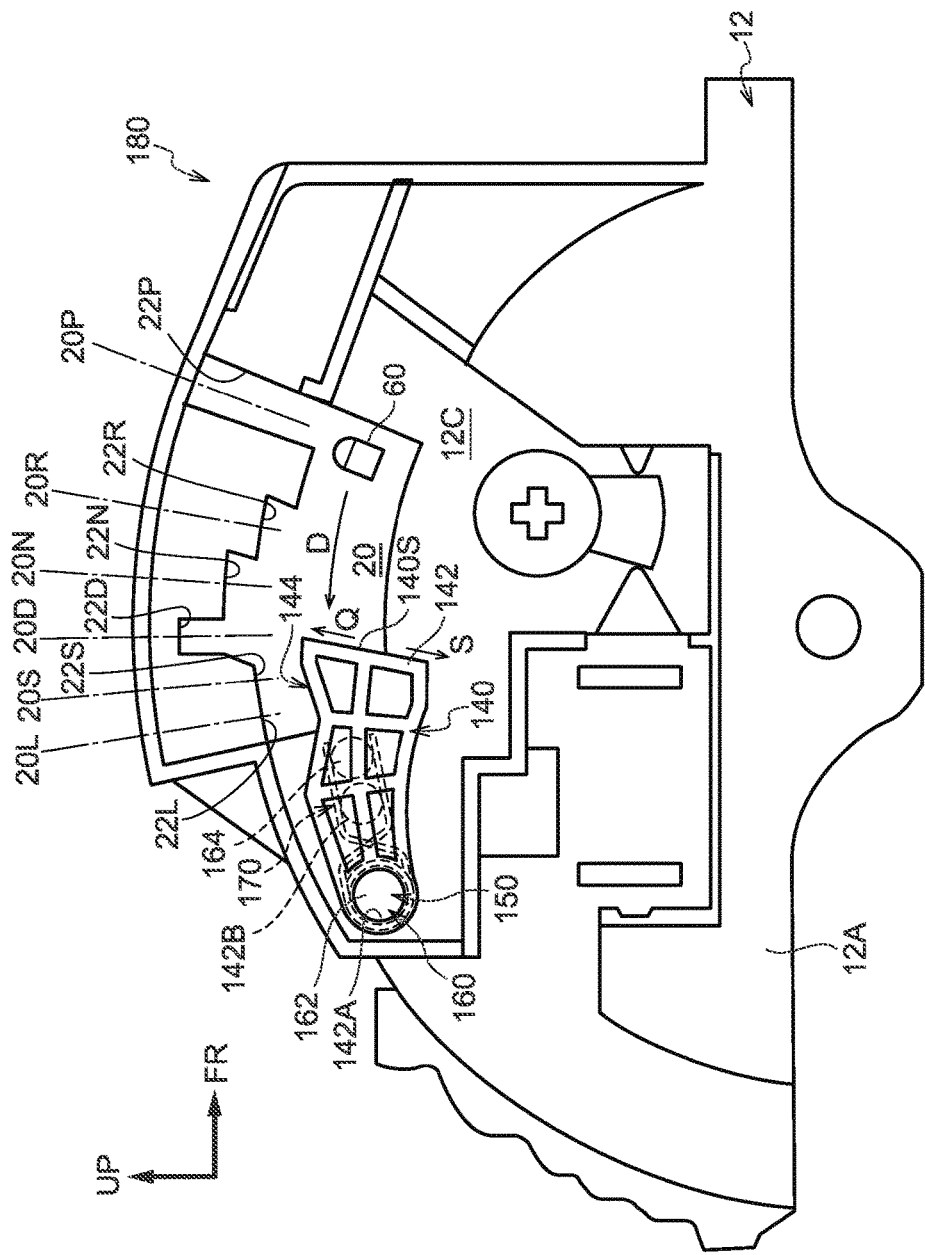
FIG. 21 is a side view viewed along a vehicle side face direction from the opposite side in the vehicle width direction to FIG. 1, etc., showing a shift device according to a fourth exemplary embodiment.

The shift device 180 according to the present exemplary embodiment shown in FIG. 21 has a configuration in which the restriction member 140 and the release section 150 of the shift device 130 according to the third exemplary embodiment shown in FIG. 14 and FIG. 15 have been slightly modified. With the exception of configuration of the restriction member 140 and the release section 150, the shift device 180 and the shift device 130 are substantially the same configuration as each other. Note that in order to clarify the configuration of the explanation of the fourth exemplary embodiment, each of the drawings are viewed from the opposite side in the vehicle width direction to the respective drawings referred to in the explanations of the first exemplary embodiment to the third exemplary embodiment.

Restriction Member and Release Mechanism Configuration

Figure 22A:
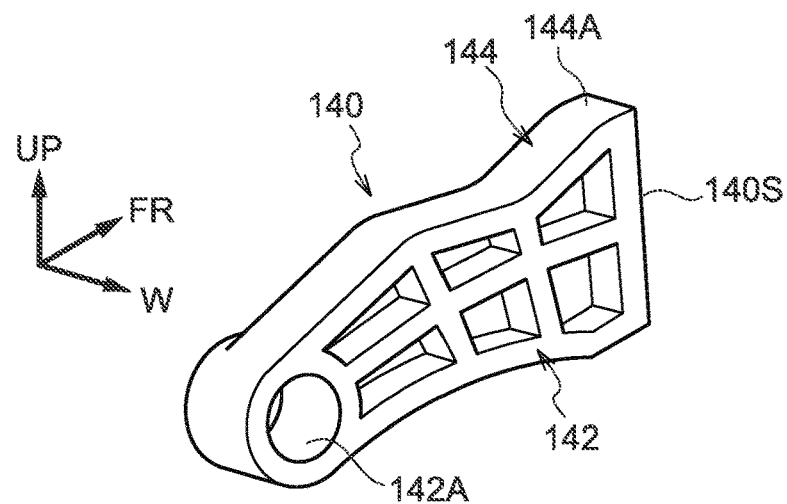
FIG. 22A is a perspective view showing a restriction member of the shift device shown in FIG. 21, viewed toward the vehicle front side along a diagonal direction at the vehicle rear side.
Figure 22B:
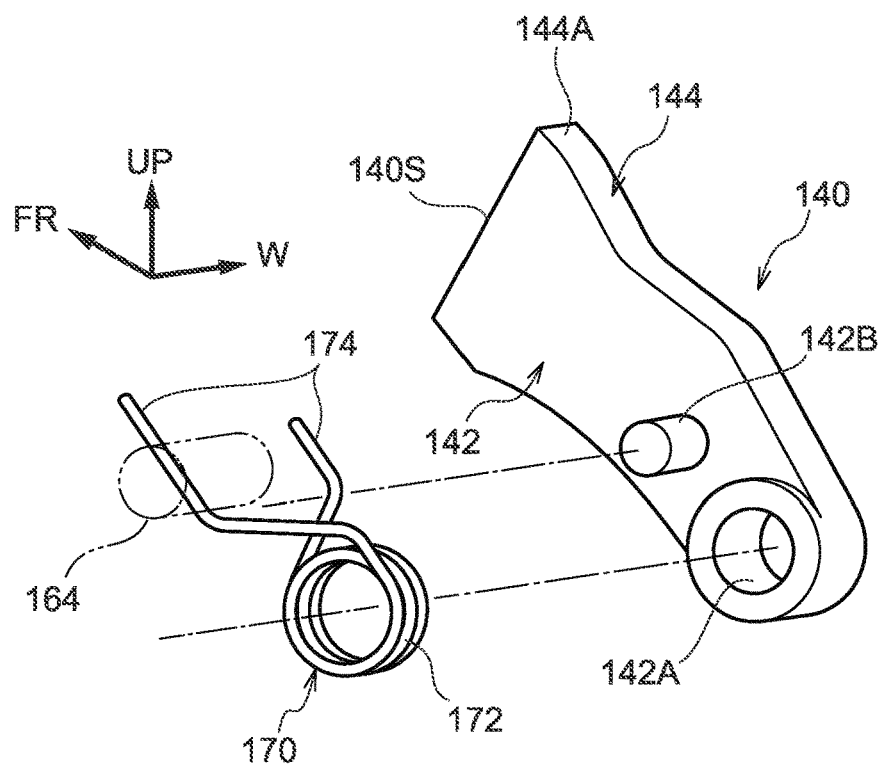
FIG. 22B is a perspective view showing the shift device shown in FIG. 22A, viewed from the opposite side in the vehicle width direction.
Figure 23:
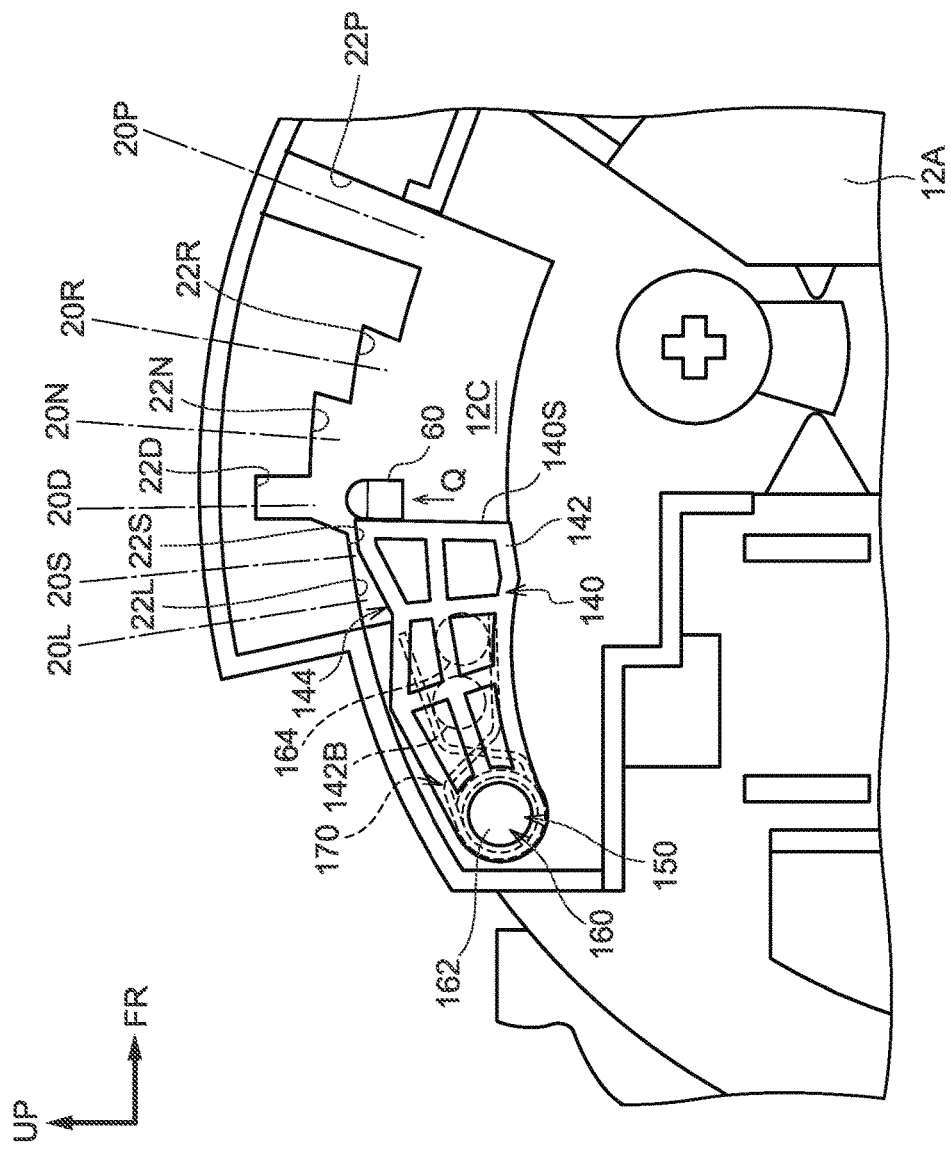
FIG. 23 is a side view showing relevant portions of the shift device shown in FIG. 21 to explain a first operation.

As shown in FIG. 21, FIG. 22A, FIG. 22B, and FIG. 23, the restriction member 140 of the shift device 180 is formed by a rotation arm 142 including a wall 140S. The wall 140S aligns in the vehicle up-down direction with the inner wall face on the vehicle rear side of the disposition position 22D. More specifically, the rotation arm 142 is formed from a resin plate member, and the rotation arm 142 has a length direction in the vehicle front-rear direction, and has a thickness direction in the vehicle width direction. A front face on one end on the vehicle front side of the rotation arm 142 configures the wall 140S that has its long length direction in the vehicle up-down direction, and a short direction in the vehicle width direction. The wall 140S aligns with the inner wall face on the vehicle rear side of the disposition position 22D in the vehicle up-down direction (in the axial direction of the shift lever 16 at the drive position 20D) when the restriction member 140 has moved from a movement start position shown in FIG. 21 to the vehicle upper side in the arrow Q direction, as shown in FIG. 23 (the stopping position). The wall 140S (the restriction member 140) moves to a movement restriction release position of the restriction member 140 that is further to the vehicle front side than the inner wall face on the vehicle rear side of the disposition position 22D when the restriction member 140 has moved from the movement start position shown in FIG. 21 to the vehicle downward side in the arrow S direction (see FIG. 25).

As shown in FIG. 21, FIG. 22A, and FIG. 22B, a pressed portion 144 is provided at the rotation arm 142 of the restriction member 140. More specifically, the pressed portion 144 is provided at an upper face on the vehicle upper side of the rotation arm 142, further to the second gear position 20S side than the wall 140S. An upper end portion 144A of the pressed portion 144 is positioned on the vehicle front side, and is contiguous to (connected to) an upper end portion of the wall 140S. The pressed portion 144 extends from the upper end portion 144A in a diagonal direction toward the vehicle rear side and toward the vehicle lower side. Namely, the pressed portion 144 configures an inclined face.

As shown in FIG. 21, FIG. 22A, and FIG. 22B, a movement section 160 of the release section 150 includes a rotation shaft hole 142A provided penetrating in the vehicle width direction at another end portion on the vehicle rear side of the rotation arm 142, and a rotation shaft 162 that fits together with the rotation shaft hole 142A. The rotation shaft 162 is integrally formed at the side face plate 12A at a portion further to the vehicle rear side than the detent plate section 20, and is formed projecting out from the side face plate 12A toward the space section 12C side, with axial direction in the vehicle width direction. The rotation shaft 162 according to the present exemplary embodiment is formed further to the vehicle rear side and the vehicle upper side than the rotation shaft 162 according to the third exemplary embodiment. The one end at the vehicle front side of the rotation arm 142, namely the wall 140S, turns about the rotation shaft 162.

The movement section 160 further includes a retaining portion 164 that retains the restriction member 140 at the movement start position, and a release portion 142B that releases movement of the restriction member 140 to the stopping position and movement of the restriction member 140 to the movement restriction release position. Note that as shown in FIG. 21, the movement start position of the restriction member 140 is a position where the wall 140S is between the inner wall face on the vehicle front side of the disposition position 22D and the inner wall face on the vehicle rear side of the disposition position 22D, and is disposed between the stopping position and the movement restriction release position of the restriction member 140. The movement start position is the start position of movement of the restriction member 140 toward the stopping position by movement of the detent pin 60 that is in the release position toward the vehicle rear side, and is also the start position of movement of the restriction member 140 toward the movement restriction release position by movement of the detent pin 60 toward the vehicle lower side, from the disposition position 22D (non-release position) to the release position. As shown in FIG. 23, the stopping position is a position where the restriction member 140 has been moved toward the vehicle upper side (the wall 140S has been moved toward the vehicle rear side) with respect to the movement start position (FIG. 21) such that the wall 140S of the restriction member 140 is aligned with the inner wall face on the vehicle rear side of the disposition position 22D so as to open the disposition position 22D, and is a position where the detent pin 60 is capable of movement from the release position to the disposition position 22D, and can be fixed at the drive position 20D. As shown in FIG. 25, the movement restriction release position of the restriction member 140 is a position where the restriction member 140 has been moved to the vehicle lower side by movement of the detent pin 60 from the disposition position 22D to the release position, thereby releasing restriction by the restriction member 140 of movement of the shift lever 16 toward the second gear position 20S. Note that although the movement section 160 of the present exemplary embodiment is not specifically provided with the limiting portion 12S of the movement section 160 of the third exemplary embodiment, a similar limiting portion 12S may be provided at the appropriate side face plate 12A.

As shown in FIG. 21, the retaining portion 164 is integrally formed to the side face plate 12A at an intermediate portion between the detent plate section 20 of the side face plate 12A, and the rotation shaft 162 of the movement section 160. The retaining portion 164 projects out from the side face plate 12A toward the vehicle width direction inside. Similarly to the retaining portion 164 of the third exemplary embodiment, the retaining portion 164 of the present exemplary embodiment is formed in a circular column shape with its axial direction along the vehicle width direction. The release portion 142B is integrally formed to the rotation arm 142 at an intermediate portion between the wall 140S and the rotation shaft hole 142A of the rotation arm 142. The release portion 142B projects out from the rotation arm 142 toward the vehicle width direction outside, toward the side face plate 12A. Similarly to the retaining portion 164, the shape of the release portion 142B is not particularly limited; however in the present exemplary embodiment, the release portion 142B has a circular column shape with axial direction in the vehicle width direction. A diameter dimension of the release portion 142B and a diameter dimension of the retaining portion 164 are set substantially the same as each other. The release portion 142B is positioned between the rotation shaft 162 and the retaining portion 164 in the side view.

Similarly to the resilient member 170 of the third exemplary embodiment, the resilient member 170 is the main configuration of the release section 150, and as shown in FIG. 21 and FIG. 22B, the resilient member 170 spans between the retaining portion 164 and the release portion 142B of the movement section 160. A torsion coil spring is likewise employed as the resilient member 170, and an assembly method of the resilient member 170 is similar to the assembly method of the third exemplary embodiment. As shown in FIG. 21, in a state in which the shift lever 16 (see FIG. 1) has not been moved at the drive position 20D, the release portion 142B is positioned on a straight line joining the center of the rotation shaft 162 of the movement section 160 to the center of the retaining portion 164, such that the resilient member 170 retains the restriction member 140 in the movement start position. As shown in FIG. 23, when, for example, the shift lever 16 is moved from the parking position 20P to the drive position 20D, the detent pin 60 that has been moved at the release position presses the wall 140S to the vehicle rear side, namely, presses the restriction member 140 upward in the arrow Q direction, against the urging force of the resilient member 170. The release portion 142B accordingly is moved from the straight line joining the rotation shaft 162 and the retaining portion 164 toward the vehicle upper side, and both end portions 174 of the resilient member 170 are spread apart by the retaining portion 164 and the release portion 142B. As shown in FIG. 25, for example, when the shift lever 16 has been moved at the drive position 20D, when the detent pin 60 moves from the disposition position 22D to the release position, the detent pin 60 pushes down the pressed portion 144, such that the restriction member 140 is moved from the movement start position toward the arrow T direction, this being the vehicle lower side, as far as the movement restriction release position of the restriction member 140. The release portion 142B accordingly is moved away from the straight line joining the rotation shaft 162 and the retaining portion 164 toward the vehicle lower side, and both end portions 174 of the resilient member 170 are spread apart by the retaining portion 164 and the release portion 142B. When the resilient member 170 is spread apart, the resilient member 170 accordingly generates urging force to return the restriction member 140 to the movement start position.

Shift Device Operation

Next, explanation follows regarding operation of the shift device 180 according to the present exemplary embodiment, with reference to FIG. 21 to FIG. 25. In the shift device 180, first, the driver performs a release operation using the operation button 18 (see FIG. 1) of the shift knob, not shown in the drawings. The release operation releases fixing of the detent pin 60 in the placement position 22P at the parking position 20P, and, as shown in FIG. 21, the detent pin 60 moves toward the release position.

In order to select the drive mode and drive the vehicle forward, the driver moves the shift lever 16 in the arrow D direction toward the drive position 20D as shown in FIG. 21, while continuing the release operation. Due to the movement of the shift lever 16, the detent pin 60 that is in the release position abuts the wall 140S of the restriction member 140 that is in the movement start position, and as shown in FIG. 23, also pushes up the restriction member 140 in the arrow Q direction against the urging force of the resilient member 170 of the release section 150, thereby moving the wall 140S of the restriction member 140 toward the vehicle rear side. The restriction member 140 moves (rotates) about the rotation shaft 162 due to the movement section 160 of the release section 150, and the movement of the restriction member 140 is stopped when the wall 140S (the restriction member 140) has moved as far as the stopping position. The detent pin 60 is accordingly stopped at the drive position 20D. Namely, movement of the detent pin 60 toward the respective shift positions of the second gear position 20S and the low gear position 20L is restricted. Movement of the detent pin 60 is also restricted in a similar manner when the shift lever 16 is moved from the reverse position 20R and the neutral position 20N respectively.

The driver ends the release operation of the operation button 18 and performs a fixing operation. As shown in FIG. 24, by the fixing operation the detent pin 60 is moved in the arrow R direction toward the disposition position 22D at the drive position 20D, and the detent pin 60 is fixed. Note that when the detent pin 60 moves in the arrow R direction from the release position toward the disposition position 22D, the pushing up of the wall 140S by the detent pin 60 ends at the exact moment when the detent pin 60 passes over the upper end portion 144A (see FIG. 22A and FIG. 22B) of the wall 140S of the restriction member 140. The restriction member 140 is accordingly returned in the arrow S direction, from the stopping position to its original movement start position, by the urging force of the resilient member 170 (the movement to the stopping position is released).

From the drive mode, in order to select the second gear mode and change the forward drive gear ratio of the vehicle, the driver uses the operation button 18 of the shift knob to perform the release operation again. As shown in FIG. 25, by the release operation the detent pin 60 at the disposition position 22D is moved in the arrow T direction toward the release position. Due to this movement of the detent pin 60, the detent pin 60 abuts the pressed portion 144 of the restriction member 140, pushing down the restriction member 140 and the wall 140S further toward the vehicle lower side. When the detent pin 60 moves as far as its release position, the restriction member 140 is moved as far as its movement restriction release position, creating a space allowing movement of the detent pin 60 in the arrow U direction between the disposition position 22S at the second gear position 20S and the disposition position 22L at the low gear position 20L, and the pressed portion 144. Namely, the restriction of movement to the shift positions of the second gear position 20S and the low gear position 20L is released. The driver then moves the shift lever 16 from the drive position 20D to the second gear position 20S, and ends the release operation of the operation button 18 and performs a fixing operation. The shift lever 16 is thereby fixed in the second gear position 20S. Note that the shift lever 16 can be moved in the arrow V direction to select the neutral mode, the reverse mode, or the parking mode after selecting the drive mode, without selecting the second gear mode or the low gear mode.

Operation and Advantageous Effects of the Fourth Exemplary Embodiment

The shift device 180 according to the present exemplary embodiment enables similar operation and advantageous effects to the operation and advantageous effects obtained by the shift device 130 according to the third exemplary embodiment.

Moreover, as shown in FIG. 21, in the shift device 180 according to the present exemplary embodiment, the restriction member 140 and the release section 150 are housed in the space section 12C between the side face plate 12A and the side face plate 12B. The empty space of the space section 12C can accordingly be more effectively utilized than in the shift device 130 according to the third exemplary embodiment, in which the restriction member 140 and the release section 150 are provided at the vehicle width direction outside of the side face plate 12A, thereby enabling a reduction in size of the shift device 180. Note that the shift device 180 can also obtain similar operation and advantageous effects to the shift device 10 according to the first exemplary embodiment, and the shift device 80 according to the second exemplary embodiment.

Supplementary Explanation of the Above Exemplary Embodiments

The present invention is not limited to the above exemplary embodiments, and, for example, the following modifications are possible within a scope not departing from the spirit of the present invention. For example, in the exemplary embodiments described above, explanation has been given regarding an example in which in a straight type shift device, it is restricted from skipping a drive position. The present invention may be configured as a shift device that is restricted from skipping any shift position of a reverse position, a neutral position, a manual position, or a second gear position in either a straight type or gate type shift device. For example, in a case in which skipping a reverse position is restricted, a shift device is provided with a restriction member that stops a detent pin at that shift position, and a release mechanism that releases this restriction.

The present invention is not limited to a shift lever operation from a parking position toward a low gear position, and may restrict skipping a given shift position in a shift lever operation from a low gear position toward a parking position.

What is claimed is:

1. A shift device comprising:
   a housing;
   a shift member that is provided at the housing so as to be rotatable in a first rotation direction and in a second rotation direction so as to be movable from a first shift position to a third shift position through a second shift position;
   a detent section that is provided at the housing, and that includes a first detent portion and a second detent portion;
   a detent pin that is provided at the shift member such that the detent pin is arranged inside the detent section, and that is movable relative to the shift member between a non-release position and a release position on the shift member, movement of the shift member from the first shift position to the second shift position being enabled by the detent pin being positioned at the release position;
   a restriction and release section that is movably mounted on the housing and that includes an engagement surface, the restriction and release section being movable relative to the housing in a first direction to a first position and in a second direction which is different from the first direction to a second position;
   wherein when the detent pin is positioned at the release position, and the shift member is rotated from the first shift position toward the third shift position, the detent pin engages the engagement surface and moves the restriction and release section in the first direction to the first position, which restricts further rotational movement of the shift member beyond the second shift position, and
   wherein when the detent pin is positioned at the non-release position and the shift member is at the second shift position, the detent pin disengages the engagement surface and restriction of further rotational movement of the shift member beyond the second shift position by the restriction and release section is released due to the restriction and release section moving in the second direction to the second position, such that the shift member is free to rotate into the third shift position when the detent pin is subsequently positioned into the release position.

2. The shift device of claim 1, wherein the restriction and release section includes:
   a movable member that is moved by the detent pin which has been moved at the release position when the shift member is moved from the first shift position to the second shift position, and whose movement by the detent pin is canceled by movement of the detent pin to the release position being canceled when the shift member has been moved at the second shift position; and
   a movement section that, when the shift member has been moved at the second shift position, moves the restriction and release section via the movable member by the detent pin being moved from the non-release position toward the release position, to release the restriction of movement of the shift member toward the third shift position.

3. The shift device of claim 2, wherein: the movable member is capable of moving with respect to the restriction member in a movement direction of the detent pin when the detent pin is moved accompanied by movement of the shift member from the first shift position toward the second shift position; and the movable member is restricted from moving with respect to the restriction member in a movement direction of the detent pin when the detent pin is moved toward the release position from the non-release position.

4. The shift device of claim 3, wherein the movement section is configured so as to turn the restriction member.

5. The shift device of claim 3, wherein the movement section is configured so as to slide the restriction member.

6. The shift device of claim 2, wherein the movement section is configured so as to turn the restriction and release section.

7. The shift device of claim 2, wherein the movement section is configured so as to slide the restriction member.

8. The shift device of claim 1, wherein the restriction and release section includes a resilient member, wherein:

when the shift member has been moved at the second shift position, the resilient member moves the restriction and release section to a movement start position at which releasing of the restriction of movement of the shift member toward the third shift position by the restriction and release section is started when movement of the detent pin to the release position is canceled; and when the shift member has been moved at the second shift position, the detent pin moves, against urging force of the resilient member, the restriction and release section from the movement start position to release the restriction of movement of the shift member toward the third shift position by the restriction and release section, by the detent pin being moved from the non-release position toward the release position.

9. The shift device of claim 1, wherein the restriction and release section is urged in the second direction by an urging member.

10. The shift device of claim 1, wherein the restriction and release section includes a second engagement surface that is different from the engagement surface recited in claim 1, and when the detent pin is positioned at the non-release position and the shift member is at the second shift position, the restriction and release section is moved in the second direction to the second position by the detent pin engaging and pressing the second engagement surface due to the detent pin moving from the non-release position to the release position.

11. The shift device of claim 10, further comprising a restricting portion which is provided at the housing, wherein when the detent pin is positioned at the release position, and the shift member is rotated from the first shift position toward the third shift position, the detent pin engages the engagement surface and moves the restriction and release section in the first direction to the first position, which restricts the further rotational movement of the shift member beyond the second shift position by the restriction and release section being abutted and stopped by the restricting portion.

12. The shift device of claim 1, further comprising a restricting portion which is provided at the housing, wherein when the detent pin is positioned at the release position, and the shift member is rotated from the first shift position toward the third shift position, the detent pin engages the engagement surface and moves the restriction and release section in the first direction to the first position, which restricts the further rotational movement of the shift member beyond the second shift position by the restriction and release section being abutted and stopped by the restricting portion.

* * * * *